United States Patent
Kashimura et al.

(10) Patent No.: US 11,390,738 B2
(45) Date of Patent: Jul. 19, 2022

(54) COMPOSITE RESIN COMPOSITION AND METHOD FOR PRODUCING COMPOSITE RESIN COMPOSITION

(71) Applicant: SAIDEN CHEMICAL INDUSTRY CO., LTD., Tokyo (JP)

(72) Inventors: Kota Kashimura, Saitama (JP); Kenichiro Ishimoto, Saitama (JP)

(73) Assignee: SAIDEN CHEMICAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/311,605

(22) PCT Filed: Jun. 3, 2020

(86) PCT No.: PCT/JP2020/021892
§ 371 (c)(1),
(2) Date: Jun. 7, 2021

(87) PCT Pub. No.: WO2020/246493
PCT Pub. Date: Dec. 10, 2020

(65) Prior Publication Data
US 2022/0017739 A1   Jan. 20, 2022

(30) Foreign Application Priority Data
Jun. 6, 2019 (JP) .............................. JP2019-106271
Oct. 7, 2019 (JP) .............................. JP2019-184498

(51) Int. Cl.
| | | |
|---|---|---|
| C08L 33/20 | (2006.01) | |
| C08F 2/22 | (2006.01) | |
| C08F 212/10 | (2006.01) | |
| C08F 220/06 | (2006.01) | |
| C08F 220/44 | (2006.01) | |
| C08L 1/02 | (2006.01) | |
| C08L 25/12 | (2006.01) | |
| C08L 25/14 | (2006.01) | |
| C08L 33/10 | (2006.01) | |

(52) U.S. Cl.
CPC ............... *C08L 33/20* (2013.01); *C08F 2/22* (2013.01); *C08F 212/10* (2013.01); *C08F 220/06* (2013.01); *C08F 220/44* (2013.01); *C08L 1/02* (2013.01); *C08L 25/12* (2013.01); *C08L 25/14* (2013.01); *C08L 33/10* (2013.01)

(58) Field of Classification Search
CPC ........ C08F 212/10; C08F 2/22; C08F 220/06; C08F 220/44; C08L 25/12; C08L 25/14; C08L 33/10; C08L 1/02; C08L 33/20
See application file for complete search history.

(56) References Cited

FOREIGN PATENT DOCUMENTS

| | | |
|---|---|---|
| CN | 107841222 | 3/2018 |
| EP | 2460934 | 6/2012 |
| EP | 3202854 | 8/2017 |
| JP | 2012-092203 | 5/2012 |
| JP | 2012-167202 | 9/2012 |
| JP | 2014-105217 | 6/2014 |
| JP | 2014-193959 | 10/2014 |
| JP | 2015-218228 | 12/2015 |
| JP | 2016-033187 | 3/2016 |
| JP | 2016-155897 | 9/2016 |
| JP | 2017-061594 | 3/2017 |
| JP | 2019-014845 | 1/2019 |
| WO | 2014/017912 | 1/2014 |

OTHER PUBLICATIONS

International Search Report, issued in the corresponding PCT application No. PCT/JP2020/021892, dated Aug. 11, 2020, 7 pages (including translation).
Engström et al., "Soft and rigid core latex nanoparticles prepared by RAFT-mediated surfactant-free emulsion polymerization for cellulose modification—a comparative study", Polym. Chem., 2017, 8, pp. 1061-1073.
Extended European Search Report, issued in the corresponding European patent application No. 20818854.0, dated Jan. 21, 2022, 7 pages.
International Preliminary Report on Patentability, issued in the corresponding PCT application No. PCT/JP2020/021892, dated Dec. 7, 2021, 6 pages, with translation.

*Primary Examiner* — Angela C Scott
(74) *Attorney, Agent, or Firm* — Hamre, Schumann, Mueller & Larson, P.C.

(57) ABSTRACT

The present invention provides a composite resin composition capable of forming a film in which a cellulose nanofiber is dispersed uniformly in the resin. The present invention provides a composite resin composition containing an aqueous dispersion medium, a resin particle emulsified in the aqueous dispersion medium, and a cellulose nanofiber dispersed in the aqueous dispersion medium, wherein the resin particle contains at least one selected from the group consisting of a (meth)acrylic resin particle, a styrene-based resin particle, and a (meth)acrylonitrile-based resin particle, and when a sample obtained in such a way that a liquid obtained by diluting the composite resin composition with water in an amount that allows a non-volatile content of the composite resin composition to fall within a range of 0.01 to 0.1% by mass is dropped onto a base material for measurement and is dried is observed with an atomic force microscope, a structure such that the cellulose nanofiber is dispersed, and the resin particles cling in the form of particles to the cellulose nanofiber is observed.

4 Claims, 4 Drawing Sheets

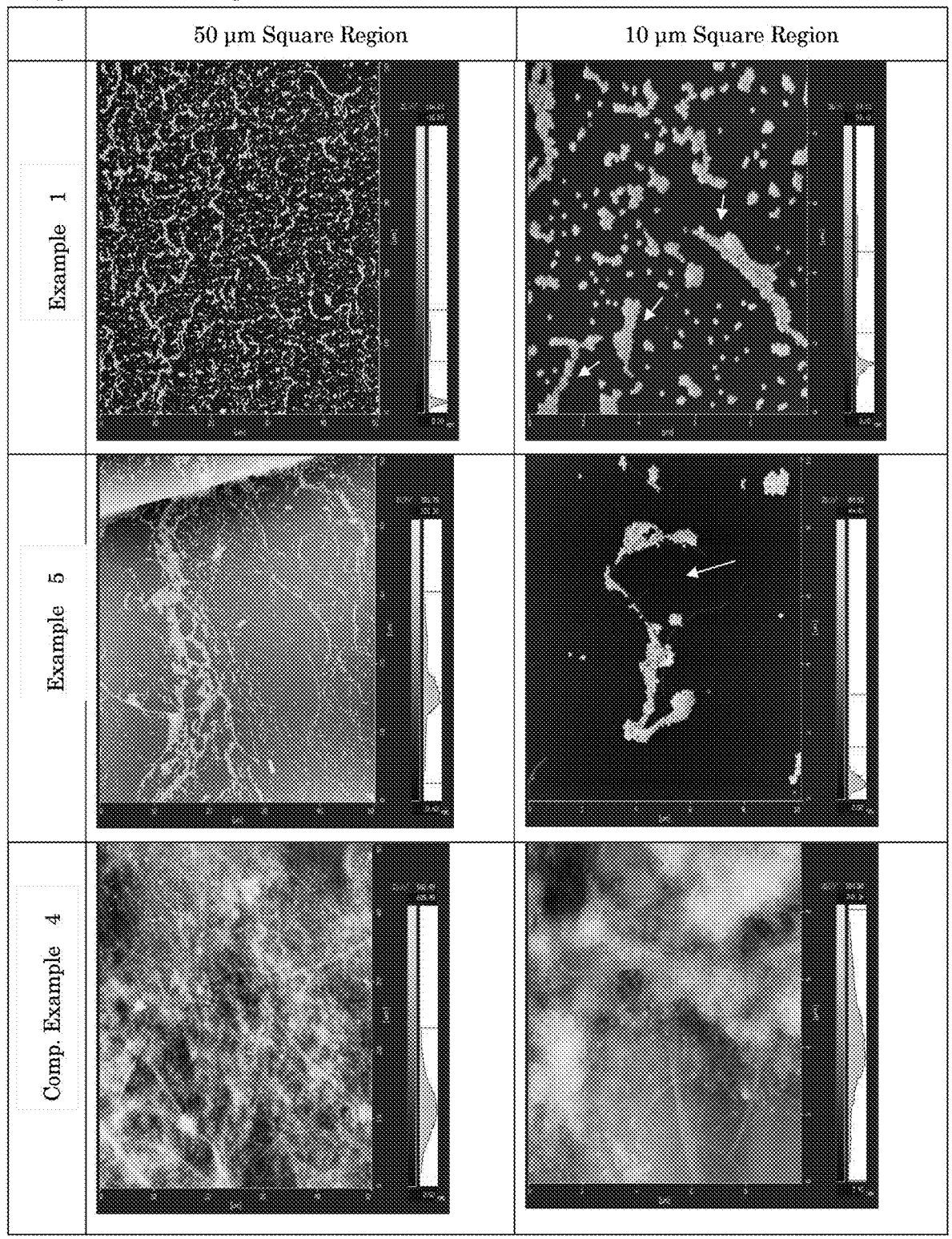

[Figure 2]
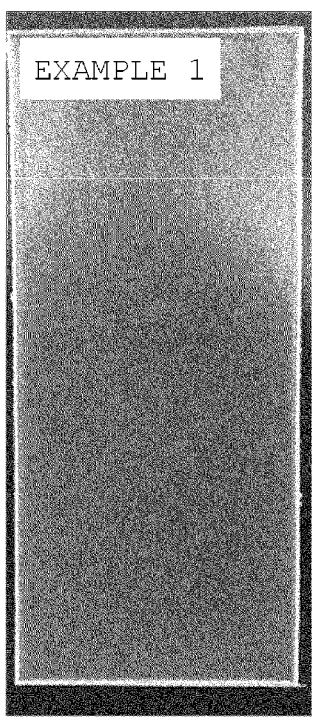
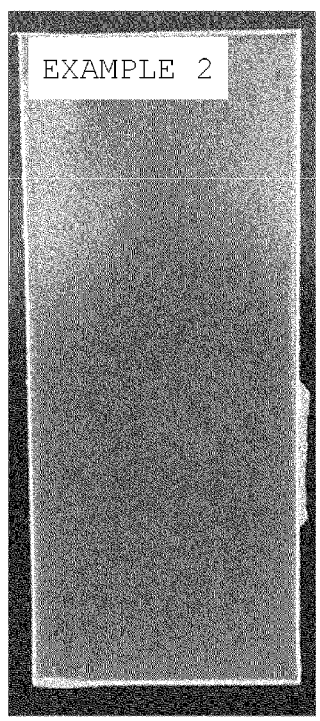
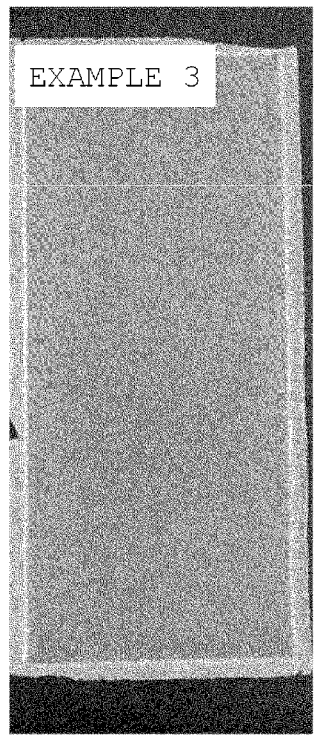
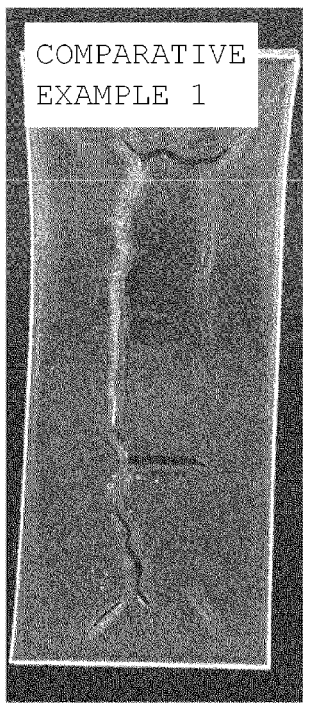
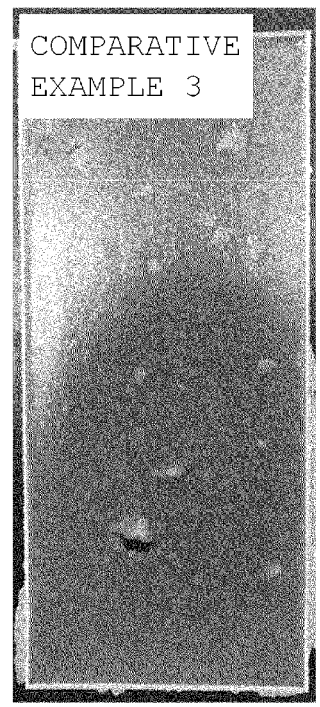
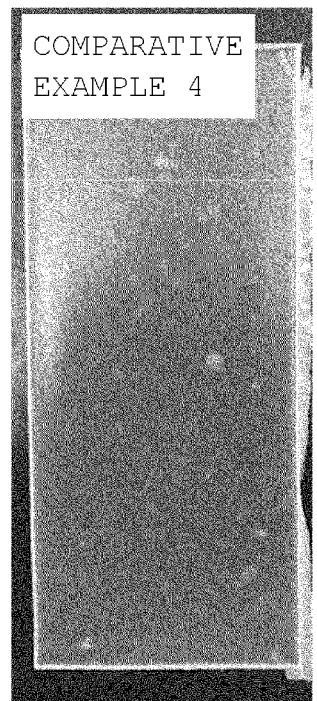

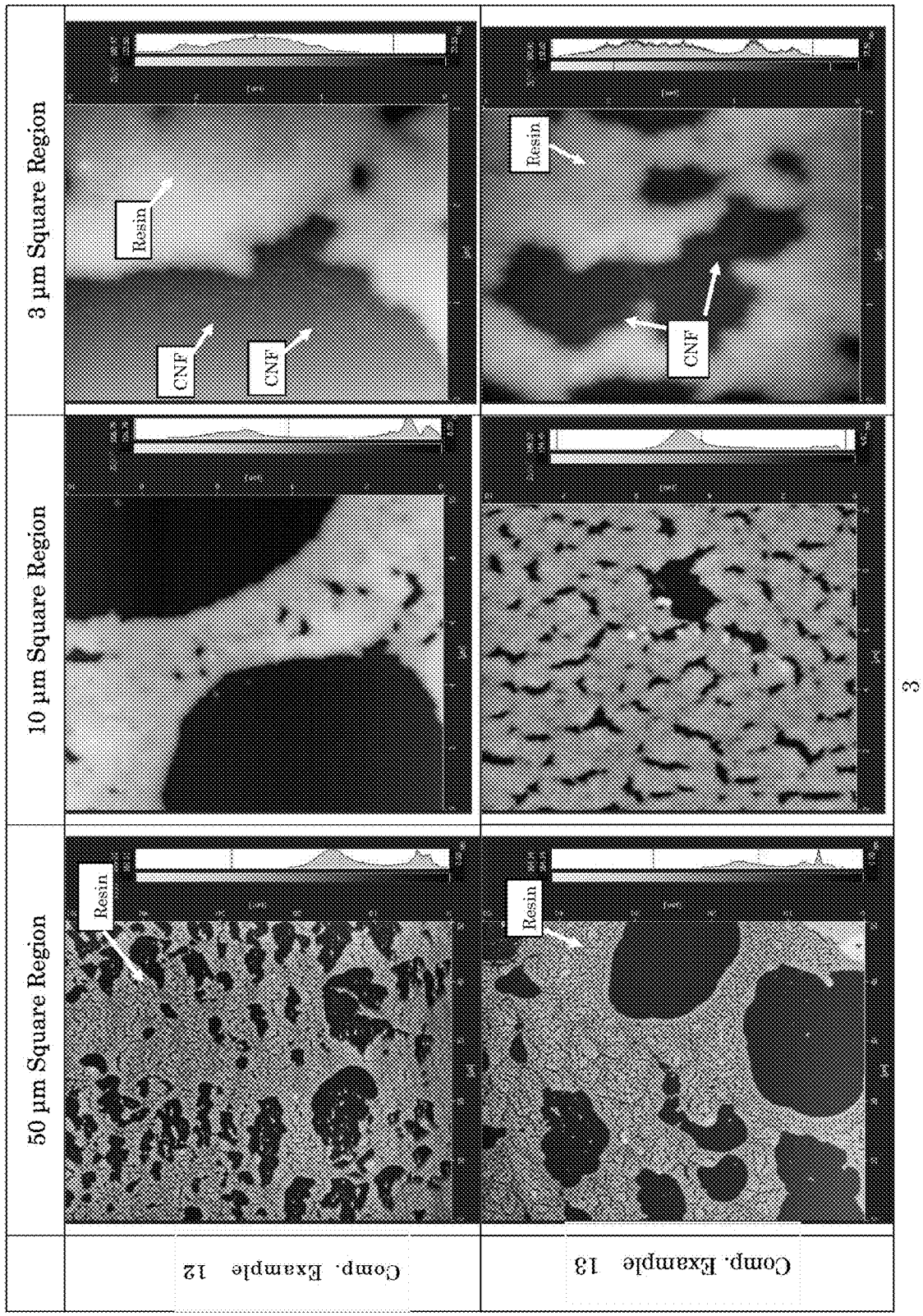

[Figure 4]
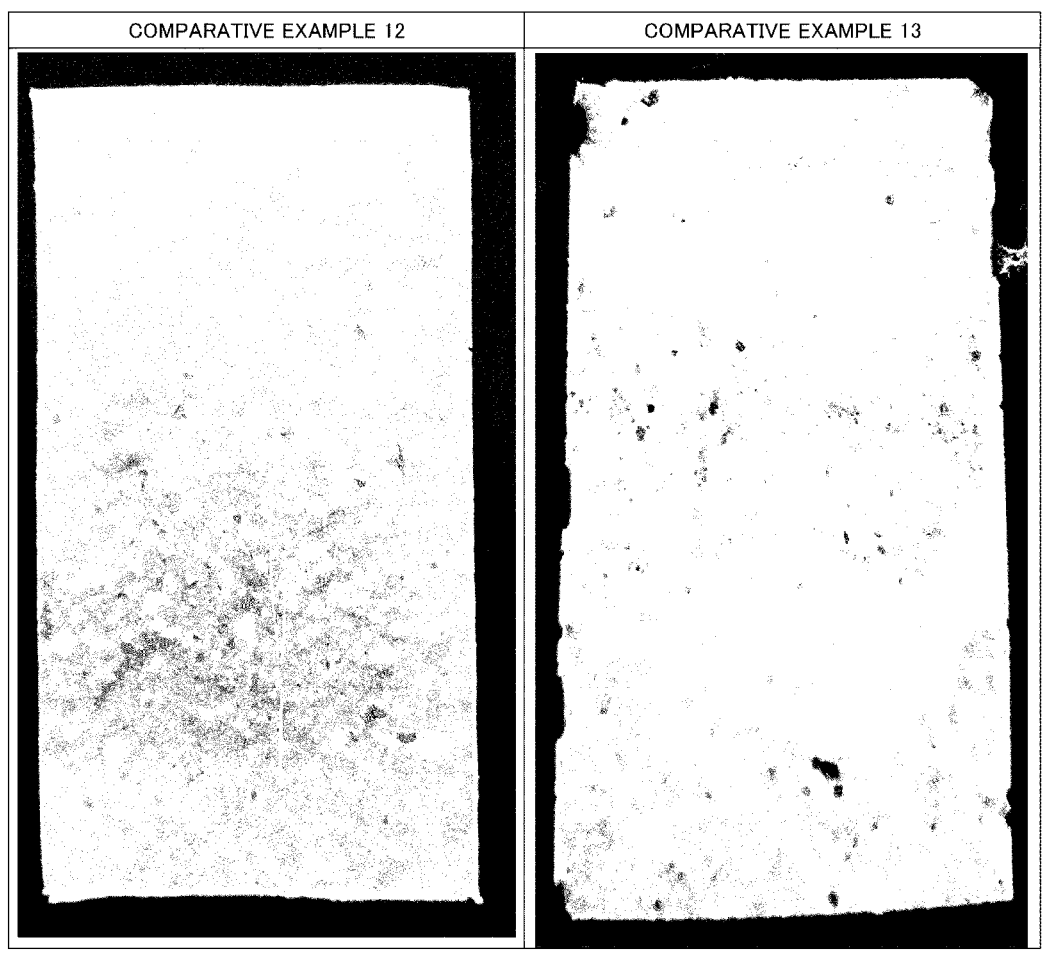

COMPOSITE RESIN COMPOSITION AND METHOD FOR PRODUCING COMPOSITE RESIN COMPOSITION

TECHNICAL FIELD

The present invention relates to a composite resin composition and a method for producing a composite resin composition.

BACKGROUND ART

A cellulose nanofiber (hereinafter, sometimes written as "CNF") is a fiber material that is obtained by finely disentangling (defibrating) a cellulose fiber, which is derived mainly from cell walls of a plant, into nano size. CNF has been attracting attention as a sustainable resource because it is eco-friendly in that it can be taken out from various types of biomass derived from plants in addition to many advantages, such as light weight, high strength, high elastic modulus, and small thermal deformation, and development of a composite material with another material, such as rubber or a resin, has also been progressing.

For example, Patent Literature 1 discloses a composite resin composition that contains a cellulose nanofiber having an average diameter of 3 to 400 nm in the resin and is constituted in order to make it possible to produce a shaped body which achieves both of transparency and strength. In addition, Patent Literature 2 discloses a latex emulsion obtained by blending a predetermined amount of a cellulose nanofiber into a natural rubber-based latex, an acrylic-based emulsion, or the like in order to enhance the holding force or the like of the latex emulsion.

Further, Patent Literature 3 discloses a composite resin composition that is obtained by polymerizing a polymerizable compound in a dispersion liquid obtained by dispersing the polymerizable compound and a cellulose nanofiber in a solvent. Furthermore, Patent Literature 4 discloses a method for producing a composite containing: a copolymer composed of ethylenically unsaturated monomers; and a cellulose nanofiber by copolymerizing the ethylenically unsaturated monomers in a dispersion liquid of a cellulose nanofiber. Patent Literature 5 discloses a method for producing a composite by copolymerizing ethylenically unsaturated monomers in a dispersion liquid of a cellulose nanofiber modified with a glycidyl group-containing (meth) acrylate compound.

CITATION LIST

Patent Literature

Patent Literature 1: Japanese Patent Laid-Open No. 2012-167202
Patent Literature 2: Japanese Patent Laid-Open No. 2015-218228
Patent Literature 3: Japanese Patent Laid-Open No. 2014-105217
Patent Literature 4: Japanese Patent Laid-Open No. 2016-155897
Patent Literature 5: Japanese Patent Laid-Open No. 2017-061594

SUMMARY OF INVENTION

Technical Problem

In the conventional composite resin compositions containing CNF and a resin, the dispersibility of CNF is low in some cases because CNF aggregates or is dispersed non-uniformly when CNF and the resin are mixed. In Patent Literatures 3 to 5 mentioned previously, enhancing the dispersibility of CNF in a resin by polymerizing, in a dispersion liquid containing a predetermined polymerizable compound, CNF, an emulsifier, and water, the polymerizable compound has been proposed.

On the other hand, when a shaped product, such as a film, is formed from a composite resin composition containing CNF and a resin, it is desirable to obtain a film in which a crack and an aggregate of CNFs are hardly ascertained so that an effect (for example, an improvement in tensile strength or the like) brought about by allowing CNF to be contained can sufficiently be exhibited. As a result of studies conducted by the present inventors, it has been found that a film in which CNF is dispersed uniformly at a high level in a resin cannot be formed from a composite resin composition in some cases depending on the condition for producing the composite resin composition or a shaped product, such as a film, in the above-mentioned conventional techniques.

Accordingly, the present invention intends to provide a composite resin composition capable of forming a film in which a cellulose nanofiber is dispersed in a sufficiently uniform manner in the resin, and a method for producing the composite resin composition.

Solution to Problem

The present invention provides a composite resin composition containing: an aqueous dispersion medium; a resin particle emulsified in the aqueous dispersion medium; and a cellulose nanofiber dispersed in the aqueous dispersion medium, wherein the resin particle contains at least one selected from the group consisting of a (meth)acrylic resin particle, a styrene-based resin particle, and a (meth)acrylonitrile-based resin particle, and when a sample obtained in such a way that a liquid obtained by diluting the composite resin composition with water in an amount that allows a non-volatile content of the composite resin composition to fall within a range of 0.01 to 0.1% by mass is dropped onto abase material for measurement and is dried is observed with an atomic force microscope, a structure such that the cellulose nanofiber is dispersed, and the resin particles cling in the form of particles to the cellulose nanofiber is observed.

Further, the present invention provides a method for producing a composite resin composition, including a mixing step of bringing a resin emulsion in which at least one resin particle selected from the group consisting of a (meth) acrylic resin particle, a styrene-based resin particle, and a (meth)acrylonitrile-based resin particle is emulsified in an aqueous dispersion medium, and a cellulose nanofiber into contact with each other under a condition of a temperature of 50° C. or higher, thereby mixing the resin emulsion and the cellulose nanofiber, wherein the composite resin composition containing: the aqueous dispersion medium; the resin particle emulsified in the aqueous dispersion medium; and the cellulose nanofiber dispersed in the aqueous dispersion medium is obtained through the mixing step.

Advantageous Effects of Invention

According to the present invention, a composite resin composition capable of forming a film in which a cellulose nanofiber is dispersed in a sufficiently uniform manner in the resin, and a method for producing the composite resin composition can be provided.

BRIEF DESCRIPTION OF DRAWINGS

FIG. 1 shows observation images of respective resin compositions obtained in Examples 1 and 5, and Comparative Example 4, observed with an atomic force microscope (AFM).

FIG. 2 shows photographs obtained by taking the surfaces of respective films obtained in Examples 1 to 3, and Comparative Examples 1, 3, and 4.

FIG. 3 shows observation images of respective emulsified products obtained in Comparative Examples 12 and 13, observed with AFM.

FIG. 4 shows photographs obtained by taking the surfaces of respective films obtained in Comparative Examples 12 and 13.

DESCRIPTION OF EMBODIMENTS

Hereinafter, embodiments of the present invention will be described, but the present invention is not limited to the following embodiments.

As mentioned previously, in the conventional composite resin compositions containing a cellulose nanofiber (CNF) and a resin, the dispersibility of CNF is low in some cases. Against this, Patent Literatures 3 to 5 have proposed enhancing the dispersibility of CNF in a resin by a composite resin composition that is obtained by subjecting a predetermined polymerizable compound to emulsion polymerization in a dispersion liquid containing: the predetermined polymerizable compound for forming the resin; CNF; an emulsifier; and water. For example, Examples in Patent Literatures 4 and 5 disclose specific examples of an emulsified product obtained by subjecting a (meth)acrylic acid alkyl ester or styrene to emulsion polymerization in a CNF dispersion liquid (Examples 1 to 5 in Patent Literature 4 and Examples 1 to 4 in Patent Literature 5). The Examples in Patent Literatures 4 and 5 describe that with respect to diluted products obtained by diluting the emulsified products with a large amount of water, an aggregate of fibers is hardly observed, and that with respect to shaped products obtained by heating the emulsified products to dryness to be each shaped into the form of a sheet, the sheets are uniform, and an aggregate of fibers is not observed ([0052] to [0054] in Patent Literature 4 and [0049], [0050], and [0052] in Patent Literature 5).

However, in the evaluations by observing the diluted products obtained by diluting the emulsified products described in the Examples in Patent Literatures 4 and 5 with a large amount of water with a digital microscope, only the aggregation state of the fibers (CNFs) is an object of evaluation, and the state of the resin particles has not been evaluated ([0052] in Patent Literature 4 and [0049] in Patent Literature 5). According to the emulsified products, it is shown that a uniform sheet in which an aggregate of the fibers is not observed can be shaped; however, the evaluation of the sheet is performed in such a manner that a shaped product obtained by heating each of the emulsified products to dryness under a high-temperature condition in an oven (105° C.) and thereafter further applying pressure at a high temperature (180° C.) with a heat press to a dried product to be shaped into a sheet form is observed with a digital microscope ([0053] and in Patent Literature 4, and [0050] and [0052] in Patent Literature 5). It is considered that under such a condition for making a sheet with a heat press, a uniform sheet in which an aggregate of fibers (CNFs) is not observed can be shaped even though the level of the dispersibility of the resin particles in the emulsified products is not so high. On the other hand, it is considered that when not only CNF but also the resin particle is dispersed (emulsified) uniformly at a higher level in an emulsified product (resin composition), a film in which the number of cracks is small, and CNF is dispersed in a sufficiently uniform manner in the resin can be formed even under a calm drying condition without adopting such a method using the heat press as described above.

In addition, as a result of studies conducted by the present inventors, it has been found that depending on the condition for producing a conventional composite resin composition, as disclosed in Patent Literatures 3 to 5 mentioned above, the condition for making a shaped product, such as a film, from the composite resin composition, or the like, a shaped product in which CNF is dispersed uniformly at a high level in the resin cannot be formed from the composite resin composition in some cases.

Specifically, the present inventors have conducted studies on a composite resin composition containing: a resin emulsion obtained by emulsifying at least one resin particle of a (meth)acrylic resin particle, a styrene-based resin particle, and a (meth)acrylonitrile-based resin particle in an aqueous dispersion medium; and CNF. More specifically, a method in which, in water for initial charging, which is used for obtaining the resin emulsion, a water dispersion liquid containing CNF is also charged, and monomer components for forming the resin particle are polymerized by dropping the monomer components thereinto has been performed on a trial basis. As a result, it has been found that a large amount of aggregates containing CNF are produced in the polymerization stage by the method in some cases (see Comparative Examples 10, which will be described later). In addition, it has been found out that when a method in which a water dispersion liquid containing CNF is allowed to be contained in advance in a pre-emulsion containing the monomer components, water, and an emulsifier, and the monomer components are polymerized is performed on a trial basis, a large amount of aggregates containing CNF are also produced in the polymerization stage in some cases (see Comparative Example 11, which will be described later). Accordingly, when formation of a film from any of the composite resin compositions obtained in these cases is attempted, a film in which a crack and an aggregate containing CNF exist is to be formed.

The present inventors have considered, based on the results, that to obtain a homogeneous film in which a crack and an aggregate are hardly ascertained from a composite resin composition, CNF needs to be dispersed uniformly at a higher level in advance without allowing CNFs to aggregate in the composite resin composition before the film is formed, and have conducted diligent studies on the method for producing a composite resin composition. In the studies, the present inventors have attempted a method for obtaining a composite resin composition containing: a resin particle emulsified in an aqueous dispersion medium; and CNF dispersed in the aqueous dispersion medium in such a way that, by applying a technique of multistage polymerization, polymerization of the monomer components is completed firstly as the first stage, and then a water dispersion liquid containing CNF is added as the second stage or later. As a result, it has been found that the composite resin composition obtained by the method is capable of forming a film in which CNF is dispersed uniformly in the resin.

In the above-described method, the resin emulsion containing a polymerized product obtained by polymerizing the monomer components is obtained, and thereafter the water dispersion liquid containing CNF is added, and therefore present inventors have subsequently attempted a method in which a water dispersion liquid containing CNF is added at room temperature (about 23° C.) to a resin emulsion produced in advance. However, it has been found that in a film which is formed with a composite resin composition obtained by the method, the dispersibility of CNF in the resin is low. The present inventors have further conducted studies based on this result to find that a composite resin composition obtained by a method in which a resin emulsion produced in advance is heated to a predetermined temperature, and CNF is added to the resin emulsion under the temperature condition is capable of forming a film in which CNF is dispersed uniformly in the resin. In the above-mentioned method like the multi-stage polymerization, the method of adding CNF in a second stage or later is also such that CNF is added immediately after polymerization, and therefore the present inventors have conducted a further verification experiment based on the fact that the temperature of the resin emulsion is normal temperature or higher when CNF is added. As a result, it has been found that a film in which CNF is dispersed in a resin in a sufficiently uniform manner can be formed by a method including a step of bringing a resin emulsion and CNF into contact with each other under a condition of a temperature of 50° C. or higher, thereby mixing the resin emulsion and CNF.

In addition, the composite resin composition obtained by the production method is capable of forming a film in which CNF is dispersed in the resin in a sufficiently uniform manner, and therefore the present inventors considers that CNF is dispersed uniformly at a higher level in the composite resin composition before the film is formed, and have analyzed the composite resin composition. It is generally difficult to ascertain in detail the dispersibility of CNF in a composite resin composition which is a liquid. Thus, the present inventors have prepared a sample in which a film is not formed (non-film dry sample) by diluting a composite resin composition with a large amount of water and dropping one drop to several drops of the resultant liquid onto a base material for measurement to dry the liquid, and have observed the sample with an atomic force microscope (AFM) for the purpose of observing the sample in a state which is close to the state of the composite resin composition itself. As a result, with respect to the composite resin composition that is capable of forming a film in which CNF is dispersed in the resin in a sufficiently uniform manner, a structure such that CNF is dispersed, and resin particles cling in the form of particles to the CNF has been observed. It has been found that this structure is not ascertained in a composite resin composition which has formed a film in which the dispersibility of CNF in the resin is low, and is specific.

Hereinafter, the composite resin composition and the method for producing a composite resin composition, which have been found as a result of the above-mentioned studies, will be described in detail.

<Composite Resin Composition>

The composite resin composition of one embodiment of the present invention contains: an aqueous dispersion medium; a resin particle emulsified in the aqueous dispersion medium; and a cellulose nanofiber (CNF) dispersed in the aqueous dispersion medium. The resin particle in this composite resin composition contains at least one selected from the group consisting of a (meth)acrylic resin particle, a styrene-based resin particle, and a (meth)acrylonitrile-based resin particle. This composite resin compound is such that when a sample obtained in such a way that a liquid obtained by diluting the composite resin composition with water in an amount that allows a non-volatile content of the composite resin composition to fall within a range of 0.01 to 0.1% by mass is dropped onto a base material for measurement and is dried is observed with an atomic force microscope, a structure such that CNF is dispersed, and the resin particles cling in the form of particles to the CNF is observed.

By such constitution, the composite resin composition is capable of forming a film in which CNF is dispersed in the resin in a sufficiently uniform manner. It is considered that in the composite resin composition in which the above-described structure is observed with an atomic force microscope, CNF is dispersed uniformly at a higher level almost without aggregating in the aqueous dispersion medium, and the resin particles are dispersed around the CNF in such a way as to cling to the CNF. It is considered that thereby, CNF is dispersed uniformly at a high level in the resin, and the composite resin composition is capable of forming a homogeneous film. It is to be noted that the composite resin composition is capable of forming a film in which CNF is dispersed in the resin in a sufficiently uniform manner, and therefore by using the composite resin composition, a shaped product in which CNF is dispersed in the resin in a sufficiently uniform manner can also be obtained.

For the above-described observation with an atomic force microscope (AFM), specifically, a liquid (diluted liquid) obtained in such a way that the composite resin composition is diluted about several hundred times by mass (for example, 500 times by mass) with water, and the non-volatile content of the composite resin composition is adjusted to fall within a range of 0.01 to 0.1% by mass is used. A dry sample in which a film is not formed (non-film dry sample) is prepared from the diluted liquid. Specifically, a dried product obtained in such a way that one drop to several drops (within a range of 0.01 to 0.1 mL) of the diluted liquid are dropped onto a mica standard sample (manufactured by Hitachi High-Tech Science Corporation), which is used for AFM observation, as a base material for measurement, and are dried for 24 hours in a glass desiccator in which dry silica gel is charged is used as a sample. The temperature condition during the drying can be set to a temperature at which the resin particle in the diluted liquid can take the form of a particle according to the characteristics of the composite resin composition. The sample is observed using an atomic force microscope (trade name "AFM5100N", manufactured by Hitachi High-Technologies Corporation). It is preferable that a structure such that when the cellulose nanofiber (CNF) is assumed to be an axis, the resin particles gather along and around the axis in the form of a bunch of grapes be observed in such observation with AFM, as will be shown later in Examples.

(Cellulose Nanofiber)

The cellulose nanofiber (CNF) exists in such a way as to be dispersed in the aqueous dispersion medium in the composite resin composition. The type of CNF is not particularly limited, and any type of CNF is usable. Examples of the type of CNF include CNF obtained mainly by a physical/mechanical defibration treatment (hereinafter, sometimes written as "mechanical defibration type CNF"), CNF obtained mainly by a chemical defibration treatment (hereinafter, sometimes written as "chemical defibration type CNF"), and CNF obtained by a treatment in which the physical/mechanical defibration treatment and the chemical defibration treatment are combined each as a main treatment. One type of CNF among them may be used singly, two or more types of CNF among them may be used together, or a mixture of two or more types of CNF among them may be used. In addition, CNF produced from a raw material (raw material fiber), such as, for example, pulp, may be used, or a commercially available CNF product may be used.

Examples of the mechanical defibration type CNF include CNF obtained by an aqueous counter collision method (ACC method), CNF obtained by a pulverization method using a machine, and CNF obtained by another physical/mechanical defibration treatment method. CNF by the ACC method can be obtained, for example, in such a way that suspension water containing a raw material, such as pulp, is pressurized and is jetted from nozzles opposite to each other to cause collision, and a bond between fibers is cleaved by the energy generated at the time of the collision to micronize the raw material into nano size. For example, trade name "Nanoforest®" manufactured by Chuetsu Pulp & Paper Co., Ltd., or the like can be used as CNF by the ACC method. Further, CNF by mechanical pulverization can be obtained, for example, in such a way that suspension water containing a raw material is stirred at a high speed using a wet stirring apparatus (such as, for example, a high-pressure homogenizer, an ultrahigh-speed homogenizer, an ultrasonic homogenizer, and a bead mill) to defibrate the raw material mechanically.

Examples of chemical defibration type CNF include CNF obtained by a method of subjecting suspension water containing a raw material, such as pulp, to a chemical treatment or an enzymatic treatment, and then taking out (defibrating) fiber in water, and CNF obtained by another chemical defibration treatment method. Examples of CNF which is obtained by a method using a chemical treatment include CNF produced by a TEMPO-catalyzed oxidation method. For example, trade name "Cellenpia®" manufactured by Nippon Paper Industries Co., Ltd., trade name "RHEOCRYSTA®" manufactured by DKS Co., Ltd., and the like can be used as such TEMPO-oxidized CNF. In addition, examples of CNF which is obtained by a method using an enzymatic treatment include CNF produced by performing a treatment with cellulase (cellulose hydrolyzing enzyme).

Examples of the main raw material for CNF include various types of pulp. Examples of the pulp from the viewpoint of differences in the material include: wood pulp, such as softwood pulp and hardwood pulp; non-wood pulp, such as rice straw pulp, kenaf pulp, hemp (linen) pulp, mulberry pulp, bagasse pulp, straw pulp, cotton pulp, bamboo pulp, fruit pulp, rag pulp, and linter pulp; waste paper pulp; and synthetic fiber pulp. In addition, examples of the pulp from the viewpoint of differences in the production method include: mechanical pulp, such as ground pulp (GP), refiner ground pulp (RGP), thermomechanical pulp (TMP), and chemithermomechanical pulp (CTMP); chemical pulp, such as kraft pulp (KP), sulfide pulp (SP), and alkaline pulp (AP); and non-bleached pulp and bleached pulp. Further, examples of the raw material for CNF include cellulose derived from animal materials (for example, sea squirts), algae, microorganisms (such as, for example, acetic acid bacteria), microorganism-produced products, and the like.

The size of CNF is not particularly limited as long as the fiber width is approximately nano-sized (1000 nm or less). The fiber width of CNF is, for example, preferably within a range of 1 to 1000 nm, more preferably within a range of 2 to 500 nm, and still more preferably within a range of 3 to 300 nm. The fiber length of CNF is, for example, preferably within a range of 0.1 to 500 μm, more preferably within a range of 0.1 to 100 μm, and still more preferably within a range of 0.1 to 50 μm.

When CNF is used, dispersion in the form of liquid, in the form of paste, in the form of gel, and the like, obtained by dispersing CNF in an aqueous dispersion medium, may be used, or a dried product in the form of solid, obtained by drying CNF, may be used at the time of allowing CNF to be contained in the composite resin composition. From the viewpoint of producing the composite resin composition easily, a water dispersion liquid in which the content of CNF is adjusted within a range of, for example, about 0.01 to about 10% by mass is preferably used.

The content of the cellulose nanofiber (CNF) in the composite resin composition is preferably within a range of 0.1 to 10 parts by mass per 100 parts by mass of the resin particle (the total amount of the monomer components which constitute the resin particle) in the composite resin composition. From the viewpoint of enhancing the tensile strength of a shaped product, such as a film, which is obtained from the composite resin composition, the content of CNF is more preferably 0.2 parts by mass or more, still more preferably 0.3 parts by mass or more, and yet still more preferably 0.5 parts by mass or more. In addition, from the viewpoint of enhancing the ductility (degree of elongation) of a shaped product, such as a film, which is obtained from the composite resin composition, the content of CNF is more preferably 8 parts by mass or less, still more preferably 7 parts by mass or less, and yet still more preferably 5 parts by mass or less.

(Aqueous Dispersion Medium)

As the aqueous dispersion medium which is contained in the composite resin composition, water is suitable, which is similar to the cases of water dispersion media which have generally been used in resin emulsions, and water may be used singly, or a mixture of water and a water-soluble organic solvent may be used. Examples of the water-soluble organic solvent include, but not limited to, methanol, ethanol, isopropanol, ethyl carbitol, ethylene glycol, propylene glycol, glycerin, and N-methylpyrrolidone, and one, or two or more of the water-soluble organic solvents may be used.

(Resin Particle)

The resin particle exists in the composite resin composition by being emulsified in the aqueous dispersion medium, and forms the resin emulsion together with the aqueous dispersion medium. The resin particle contains at least one selected from the group consisting of a (meth)acrylic resin particle, a styrene-based resin particle, and a (meth)acrylonitrile-based resin particle.

In the present specification, the wording "(meth)acrylic" means that both of the wordings "acrylic" and "methacrylic" are included. In addition, similarly, the wording "(meth)acrylate" means that both of the wordings "acrylate" and "methacrylate" are included.

Further, in the present specification, the "(meth)acrylic resin" refers to a polymer obtained by polymerizing a (meth)acrylic acid ester, or a copolymer obtained by polymerizing monomer components containing a (meth)acrylic acid ester as a main component. Similarly, the "styrene-based resin" refers to a polymer obtained by polymerizing a styrene-based monomer, or a copolymer obtained by polymerizing monomer components containing a styrene-based monomer as a main component. The "(meth)acrylonitrile-based resin" refers to a polymer obtained by polymerizing (meth)acrylonitrile, or a copolymer obtained by polymerizing monomer components containing (meth)acrylonitrile as a main component. The "main component" in the monomer components for forming a resin refers to a monomer (first monomer) whose content in the monomer components for forming the resin is the largest. Two or more main components may be present in the monomer components for forming a resin; any one of the monomer components may correspond to the above-mentioned main component; or the main component may be a resin which corresponds to two or more of the "(meth)acrylic resin", the "styrene-based resin", and the "(meth)acrylonitrile-based resin". Hereinafter, homopolymerization and copolymerization each are sometimes written simply as "polymerization" including both of homopolymerization and copolymerization without distinguishing homopolymerization and copolymerization.

The monomer components for forming each resin may contain, in addition to the monomer that is the main component, one, or two or more monomers (polymerizable monomers) which are other than the monomer that is the main component and have a polymerizable unsaturated bond. Accordingly, the above-described each resin particle may contain, in addition to a structural unit derived from the monomer that is the main component, a structural unit derived from one, or one or more polymerizable monomers other than the monomer that is the main component. In the present specification, the "structural unit" means a unit of a polymerizable monomer for forming a resin (polymer). Examples of the "structural unit derived from (a polymerizable monomer)" include a structural unit having a single bond (—C—C—) converted as a result of cleavage of a polymerizable double bond (C=C) in the monomer.

The content of the monomer that is to be the main component (the first monomer whose content is the largest) in the monomer components for forming the resin particle (the content by percentage of the structural unit derived from the monomer that is to be the main component in the particle) is preferably within a range of 20 to 90% by mass, more preferably within a range of 30 to 80% by mass, and still more preferably within a range of 40 to 70% by mass based on the total mass of the monomer components for forming the resin particle.

Examples of the (meth)acrylic acid ester that is used for the (meth)acrylic resin particle include a (meth)acrylic acid alkyl ester, a (meth)acrylic acid hydroxyalkyl ester, a (meth)acrylic acid alkoxyalkyl ester, a (meth)acrylic acid aralkyl ester, and a (meth)acrylic acid aryl ester, and other (meth)acrylic acid esters other than these (meth)acrylic acid esters. One, or two or more of these (meth)acrylic acid esters can be used. Among these, the monomer components for forming the (meth)acrylic resin particle preferably contain at least a (meth)acrylic acid alkyl ester, and more preferably contain a (meth)acrylic acid alkyl ester as a main component.

Examples of the (meth)acrylic acid alkyl ester include: (meth)acrylic acid alkyl esters having a straight chain or branched chain alkyl group, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, sec-butyl (meth)acrylate, n-amyl (meth)acrylate, isoamyl (meth)acrylate, n-hexyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth) acrylate, n-tridecyl (meth)acrylate, n-tetradecyl (meth)acrylate, cetyl (meth)acrylate, stearyl (meth)acrylate, and behenyl (meth)acrylate; and alicyclic (meth)acrylic acid alky esters, such as cyclohexyl (meth)acrylate, 4-tert-butylcyclohexyl (meth)acrylate, isobornyl (meth)acrylate, dicyclopentanyl (meth)acrylate, and dicyclopentenyl (meth)acrylate.

One, or two or more of these (meth)acrylic acid alkyl esters can be used. Among these, a (meth)acrylic acid alkyl ester having a C1 to 18 (more preferably, C1 to 12) straight chain or branched chain alkyl group is preferable.

Examples of the (meth)acrylic acid hydroxyalkyl ester include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 6-hydroxyhexyl (meth) acrylate, 8-hydroxyoctyl (meth)acrylate, and (4-hydroxymethylcyclohexyl)methyl (meth)acrylate. One, or two or more of these can be used.

Examples of the (meth)acrylic acid alkoxyalkyl ester include 2-methoxyethyl (meth)acrylate, 2-ethoxyethyl (meth)acrylate, 2-butoxyethyl (meth)acrylate, ethoxyethoxyethyl (meth)acrylate, and 2-phenoxyethyl (meth) acrylate. One, or two or more of these can be used.

Examples of the (meth)acrylic acid aralkyl ester include benzyl (meth)acrylate, 2-phenylethyl (meth)acrylate, methylbenzyl (meth)acrylate, and naphthylmethyl (meth)acrylate. One, or two or more of these can be used.

Examples of the (meth)acrylic acid aryl ester include phenyl (meth)acrylate, 4-hydroxyphenyl (meth)acrylate, tolyl (meth)acrylate, and naphthyl (meth)acrylate. One, or two or more of these can be used.

Examples of other (meth)acrylic acid esters include: polyalkylene glycol (meth)acrylates, such as polyethylene glycol mono(meth)acrylate, polypropylene glycol mono(meth) acrylate, and methoxy polyethylene glycol mono(meth) acrylate; (meth)acrylic acid alkyl esters having a halogen atom, such as 2-chloroethyl (meth)acrylate, trifluoroethyl (meth)acrylate, 2-(perfluorobutyl)ethyl (meth)acrylate, and perfluorooctylethyl (meth)acrylate; (meth)acrylic acid esters having an amino group, such as 2-(dimethylamino)ethyl (meth)acrylate, 2-(diethylamino)ethyl (meth)acrylate, and 3-(dimethylamino)propyl (meth)acrylate; (meth)acrylic acid esters having a carboxy group, such as carboxyethyl (meth) acrylate and carboxypentyl (meth)acrylate; (meth)acrylic acid esters having an epoxy group, such as glycidyl (meth) acrylate, glycerin mono(meth)acrylate, 2-methylglycidyl (meth)acrylate, and 3,4-epoxycyclohexylmethyl (meth) acrylate, and derivatives of thereof; (meth)acrylates having a sulphonic acid group, such as 2-sulfoethyl (meth)acrylate and 3-sulfopropyl (meth)acrylate; (meth)acrylates having a phosphoric acid group, such as 2-(phosphonooxy)ethyl (meth)acrylate; (meth)acrylates having an isocyanate group, such as 2-isocyanatoethyl (meth)acrylate; (meth)acrylates having a heterocyclic group, such as tetrahydrofurfuryl (meth)acrylate; and polyalkylene glycol mono (meth)acrylates having an alkyl group or an aryl group at an end thereof, such as methoxy polyethylene glycol (meth)acrylate and phenoxy polyethylene glycol (meth)acrylate. One, or two or more of these can be used.

The total content of the (meth)acrylic acid ester in the monomer components for forming the (meth)acrylic resin particle (the total content by percentage of the structural unit derived from the (meth)acrylic acid ester in the resin particle) is preferably 50 to 100% by mass, more preferably 60 to 99% by mass, and still more preferably 65 to 98% by mass based on the total mass of the monomer components for forming the resin particle.

In addition, the monomer components for forming each of the styrene-based resin particle and the (meth)acrylonitrile-based resin particle also preferably contain a (meth)acrylic acid ester, and more preferably contain a (meth)acrylic acid alkyl ester in addition to the main component thereof (the styrene-based monomer and (meth)acrylonitrile, respectively). The total content of the (meth)acrylic acid ester in the monomer components for forming each of the styrene-based resin particle and the (meth)acrylonitrile-based resin particle (the total content by percentage of the structural unit derived from the (meth)acrylic acid ester in the resin particles) is preferably 5 to 60% by mass, and more preferably 10 to 50% by mass based on the total mass of the monomer components for forming the resin particle.

Examples of the styrene-based monomer that is used for the styrene-based resin particle include styrene, α-methylstyrene, o-, m-, p-methylstyrene, o-, m-, p-ethylstyrene, 4-tert-butylstyrene, o-, m-, p-hydroxystyrene, o-, m-, p-methoxystyrene, o-, m-, p-ethoxystyrene, o-, m-, p-chlorostyrene, o-, m-, p-bromostyrene, o-, m-, p-fluorostyrene, and o-, m-, p-chloromethylstyrene. One, or two or more of these can be used. Among these, the monomer components for forming the styrene-based resin particle preferably contain at least styrene, and more preferably contain styrene as a main component.

Further, the monomer components for forming each of the (meth)acrylic resin particle and the (meth)acrylonitrile-based resin particle may also contain a styrene-based monomer in addition to the main component thereof (the (meth)acrylic acid ester and (meth)acrylonitrile, respectively).

(Meth)acrylonitrile that is used for the (meth)acrylonitrile-based resin particle includes acrylonitrile and methacrylonitrile, and one, or both of these can be used.

Further, the monomer components for forming each of the (meth)acrylic resin particle and the styrene-based resin particle may also contain (meth)acrylonitrile in addition to the main component thereof (the (meth)acrylic acid ester and the styrene-based monomer, respectively).

As mentioned previously, the monomer components for forming each of the (meth)acrylic resin particle, the styrene-based resin particle, and the (meth)acrylonitrile-based resin particle may contain an additional polymerizable monomer in addition to the (meth)acrylic acid ester, the styrene-based monomer, and (meth)acrylonitrile. As the additional polymerizable monomer, an unsaturated carboxylic acid-based monomer is preferable from the viewpoint of making it easy to prepare the composite resin composition, and the resin particle preferably contains a structural unit derived from the unsaturated carboxylic acid-based monomer. In the present specification, the unsaturated carboxylic acid-based monomer includes an unsaturated carboxylic acid, and an acid anhydride and a monoester thereof.

Examples of the unsaturated carboxylic acid-based monomer include: unsaturated carboxylic acids, such as (meth)acrylic acid, itaconic acid, maleic acid, fumaric acid, crotonic acid, and citraconic acid; unsaturated carboxylic acid anhydrides, such as maleic anhydride and itaconic anhydride; and monoesters of unsaturated carboxylic acids, such as maleic acid monomethyl esters, maleic acid monobutyl esters, itaconic acid monomethyl esters, and itaconic acid monobutyl esters. One, or two or more of these unsaturated carboxylic acid-based monomers are preferably used, and among these, (meth)acrylic acid is more preferably used.

The total content of the unsaturated carboxylic acid-based monomer in the monomer components for forming the resin particle (the total content by percentage of the structural unit derived from the unsaturated carboxylic acid-based monomer in the resin particle) is preferably 30% by mass or less based on the total mass of the monomer components for forming the resin particle. This total content of the unsaturated carboxylic acid-based monomer is more preferably 20% by mass or less, and still more preferably 15% by mass or less. In addition, when the unsaturated carboxylic acid-based monomer is used for the resin particle, the above-described total content of the unsaturated carboxylic acid-based monomer is preferably 0.1% by mass or more, more preferably 0.5% by mass or more, and still more preferably 1% by mass or more.

Examples of the additional polymerizable monomer other than the unsaturated carboxylic acid-based monomer also include: unsaturated monomers having a nitrogen atom, other than the above-mentioned (meth)acrylonitrile; vinyl-based monomers; unsaturated alcohols; vinyl ether-based monomers; vinyl ester-based monomers; unsaturated monomers having an epoxy group; and unsaturated monomers having a sulfonic acid group.

Examples of the unsaturated monomers having a nitrogen atom include: (meth)acrylamide-based monomers, such as (meth)acrylamide, N-methyl(meth)acrylamide, N-ethyl(meth)acrylamide, N,N-dimethyl(meth)acrylamide, N,N-diethyl(meth)acrylamide, N-isopropyl(meth)acrylamide, N-methylol(meth)acrylamide, N-butoxymethyl(meth)acrylamide, N-[2-dimethylaminoethyl](meth)acrylamide, N-[3-dimethylaminopropyl](meth)acrylamide, diacetone acrylamide, 4-acryloyl morpholine, and 4-methacryloyl morpholine; acetamide-based monomers having a vinyl group, such as N-vinylacetamide and N-vinyl-N-methylacetamide; and nitrogen-containing heterocyclic compounds having a vinyl group, such as N-vinyl-2-pyrrolidone, 4-vinylpyridine, 1-vinylimidazole, 2-vinyl-2-oxazoline, and 2-isopropenyl-2-oxazoline. One, or two or more of these can be used. Among the unsaturated monomers having a nitrogen atom, the above-described (meth)acrylamide-based monomers are preferable, and more preferably (meth)acrylamide from the viewpoint of making it easy to prepare the composite resin composition.

The total content of the unsaturated monomer having a nitrogen atom, other than (meth)acrylonitrile, in the monomer components for forming the resin particle (the total content by percentage of the structural unit derived from the unsaturated monomer having a nitrogen atom in the resin particle) is preferably 10% by mass or less, and more preferably 5% by mass or less based on the total mass of the monomer components for forming the resin particle. In addition, when the unsaturated monomer having a nitrogen atom is used for the resin particle, the total content of the above-described unsaturated carboxylic acid-based monomer is preferably 0.1% by mass or more, and more preferably 0.2% by mass or more.

Examples of the vinyl-based monomers include vinyl chloride and vinyl fluoride. Examples of the unsaturated alcohols include vinyl alcohol and allyl alcohol. Examples of the vinyl ether-based monomers include methyl vinyl ether, ethyl vinyl ether, isobutyl vinyl ether, phenyl vinyl ether, 2-hydroxyethyl vinyl ether, 4-hydroxybutyl vinyl ether, and diethylene glycol monovinyl ether. Examples of the vinyl ester-based monomers include vinyl formate, vinyl acetate, vinyl propionate, vinyl butyrate, vinyl caprylate, vinyl laurate, vinyl stearate, and vinyl versatate. Examples of the unsaturated monomers having an epoxy group include allyl glycidyl ether. Examples of the unsaturated monomers having a sulfonic acid group include vinyl sulfonate, styrene sulfonate, allyl sulfonate, methallyl sulfonate, and 2-(meth)acrylamide-2-methylpropanesulfonic acid. One, or two or more of these can be used.

Further, a monomer that can have a function as a cross-linking agent (crosslinkable monomer) can also be used as a polymerizable monomer in the monomer components for forming the resin particle. As the crosslinkable monomer, a monomer having two or more polymerizable unsaturated bonds can be used. Examples of the crosslinkable monomer include: bifunctional (meth)acrylates, such as 2-hydroxy-3-acryloyloxypropyl (meth)acrylate, ethylene glycol di(meth)acrylate, 1,3-butanediol di(meth)acrylate, 1,4-butanediol di(meth)acrylate, 1,6-hexanediol di(meth)acrylate, neopentyl glycol di(meth)acrylate, 1,9-nonanediol di(meth)acrylate, diethylene glycol di(meth)acrylate, triethylene glycol di(meth)acrylate, polyethylene glycol di(meth)acrylate, dipropylene glycol di(meth)acrylate, tripropylene glycol di(meth)acrylate, polypropylene glycol di(meth)acrylate, polytetramethylene glycol di(meth)acrylate, and glycerin di(meth)acrylate; polyfunctional (meth)acrylates, such as pentaerythritol tri(meth)acrylate, trimethylolpropane tri (meth)acrylate, pentaerythritol tetraacrylate, and dipentaerythritol hexaacrylate; allyl (meth)acrylate; divinylbenzene; and diallyl phthalate. One, or two or more of these can be used.

In addition, examples of the crosslinkable monomer also include silane coupling agents, such as 3-methacryloxypropyltrimethoxysilane, 3-methacryloxypropyltriethoxysilane, 3-methacryloxypropylmethyldimethoxysilane, 3-methacryloxypropylmethyldiethoxysilane, and 3-acryloxypropyltrimethoxysilane, and one, or two or more of them can be used.

The resin particle in the composite resin composition can be obtained by polymerizing the monomer components containing one, or two or more of the above-mentioned polymerizable monomers in the aforementioned aqueous dispersion medium. In addition, for example, a resin particle produced separately from the aqueous dispersion medium to be contained in the composite resin composition may be post-emulsified in the aqueous dispersion medium to be contained in the composite resin composition by a method such as forcible emulsification or self-emulsification. The resin particle is preferably a resin particle obtained by subjecting the monomer components for forming the resin particle to emulsion polymerization in the aqueous dispersion medium to be contained in the composite resin composition.

The average particle diameter of the resin particle, measured by a dynamic light scattering method, is not particularly limited, but is preferably 25 to 1000 nm, more preferably 35 to 600 nm, and still more preferably 45 to 400 nm. In the present specification, the average particle diameter of the resin particle, measured by a dynamic light scattering method, means an average particle diameter that is determined by cumulant method analysis using a particle size distribution measurement apparatus utilizing a dynamic light scattering method (for example, trade name "Fiber-Optics Particle Analyzer FPAR-1000" manufactured by Otsuka Electronics, Co., Ltd.).

The glass transition temperature (Tg) of the resin particle is not particularly limited, but is preferably −50 to 100° C. In the present specification, Tg of the resin particle is a value obtained by DSC measurement when the resin particle is a homopolymer. In addition, when the resin particle is a copolymer, Tg of the resin particle is a theoretical value that is determined from the following FOX equation using Tg of the homopolymers.

$$1/Tg = W_1/Tg_1 + W_2/Tg_2 + \cdots W_n/Tg_n$$

In the above-described equation, Tg represents a glass transition temperature (unit: K) of a polymer (copolymer) of n types of monomer components (monomers 1 to n). $W_1$, $W_2$, $\cdots W_n$ each represent a mass fraction of each monomer (1, 2, $\cdots$ n) to the total amount of the n types of monomer components, and $Tg_1$, $Tg_2$, $\cdots Tg_n$ each represent a glass transition temperature (unit: K) of a homopolymer of each monomer (1, 2, $\cdots$ n). For example, when monomers and the like used in Examples, which will be mentioned later, are taken as examples, the glass transition temperature of the homopolymer of each monomer is as follows, and those values are used for calculating Tg of the resin particles produced in Examples, which will be mentioned later.

n-Butyl acrylate (BA): −55° C.
Methyl methacrylate (MMA): 105° C.
Styrene (ST): 100° C.
Acrylonitrile: 105° C.
Acrylic acid (AAc): 105° C.
Acrylamide (AM): 165° C.

It is to be noted that the resin particle may be a particle having a core and a shell (so-called core-shell type resin particle). When the resin particle has a core and a shell, the resin particle may be of a homogeneous structure in which the core and the shell are completely compatible, and these cannot be distinguished, or may be of a core/shell composite structure or of a microdomain structure in which the core and the shell are not completely compatible and formed heterogeneously. The core/shell composite structure preferably takes a form such that the surface of the core is covered by the shell. In this case, it is suitable that the surface of the core is completely covered by the shell, but does not have to be completely covered, and for example, the resin particle may take a form such that the surface of the core is covered by the shell in a mesh-like form, or may take a form such that the core is exposed in some parts.

(Additional Components)

If necessary, the composite resin composition may contain an additional resin particle other than the aforementioned (meth)acrylic resin particle, styrene-based resin particle, and (meth)acrylonitrile-based resin particle, and various types of additives other than aforementioned CNF. Examples of the additive include a coloring agent, such as a pigment and a dye, a metal compound, a solvent, a plasticizer, a dispersant, a surfactant (emulsifier), a foaming agent, a sliding agent, a gelling agent, a film-forming assistant, an antifreezing agent, a crosslinking agent, a pH modifier, a viscosity modifier, an antiseptic agent, an antifungal agent, a germicide, a rust preventive agent, a flame retardant, a humectant, a defoaming agent, an antioxidizing agent, an antiaging agent, an ultraviolet ray absorber, a stabilizer, an antistatic agent, and an antiblocking agent. One, or two or more of these additives may be used.

From the viewpoint of enhancing the dispersibility of CNF in the composite resin composition more, the composite resin composition may contain a surfactant (emulsifier), and similarly, may contain, for example, a cellulose-based polymer compound that can function as a dispersant or the like. Examples of the emulsifier include an emulsifier that can be used when emulsion polymerization, which will be mentioned later, is performed, and the emulsifier may be an emulsifier that is used when the resin particle in the resin emulsion is synthesized, or an emulsifier which is blended separately from when the resin particle is synthesized. Examples of the cellulose-based polymer compound include carboxymethyl cellulose, hydroxyethyl cellulose, hydroxypropyl cellulose, methyl cellulose, and hydroxypropylmethyl cellulose, and one, or two or more of these can be used.

The non-volatile content (solid content) of the composite resin composition is preferably within a range of 1 to 70% by mass, more preferably within a range of 5 to 60% by mass, and still more preferably within a range of 10 to 50% by mass based on the total mass of the composite resin composition. In the present specification, a value measured in accordance with the prescription in JIS K6833-1:2008 can be adopted as the non-volatile content (solid content) of the composite resin composition.

The viscosity of the composite resin composition at 25° C. is preferably within a range of 1 to 10000 mPa·s, more preferably within a range of 1 to 5000 mPa·s, and still more preferably within a range of 5 to 1000 mPa·s. In the present specification, a value measured in accordance with the prescription in JIS K6833-1: 2008 can be adopted as the viscosity of the composite resin composition at 25° C.

<Method for Producing Composite Resin Composition>

Next, a method for producing a composite resin composition, the outline of which is mentioned previously, will be described in detail. The method for producing a composite resin composition of one embodiment of the present invention includes a mixing step of bringing a resin emulsion in which at least one resin particle selected from the group consisting of a (meth)acrylic resin particle, a styrene-based resin particle, and a (meth)acrylonitrile-based resin particle is emulsified in an aqueous dispersion medium, and a cellulose nanofiber into contact with each other under a condition of a temperature of 50° C. or higher, thereby mixing the resin emulsion and the cellulose nanofiber. The composite resin composition containing: an aqueous dispersion medium; a resin particle emulsified in the aqueous dispersion medium; and a cellulose nanofiber dispersed in the aqueous dispersion medium is obtained through this mixing step. It is to be noted that the resin particle, the aqueous dispersion medium, the cellulose nanofiber (CNF), and the like that are used in this description of the method for producing a composite resin composition are described in the same manner as those described in the description of the composite resin composition of the aforementioned embodiment.

A composite resin composition that is capable of forming a film in which CNF is dispersed in the resin in a sufficiently uniform manner can be produced by the production method having the above-described constitution. In addition, by this method for producing a composite resin composition, the composite resin composition of the aforementioned embodiment can also be produced. From the viewpoint of exhibiting these effects more easily, the temperature at the time when the resin emulsion and CNF are brought into contact with each other in the mixing step is preferably 55° C. or higher, more preferably 60° C. or higher, and is preferably 100° C. or lower.

When the resin emulsion and CNF are brought into contact with each other, a water dispersion liquid containing CNF is preferably used from the viewpoint of producing the composite resin composition easily. The content of CNF in this water dispersion liquid is preferably within a range of 0.01 to 10% by mass, more preferably within a range of 0.1 to 10% by mass, and still more preferably within a range of 0.2 to 5% by mass. In addition, the time for mixing the resin emulsion and CNF is, for example, preferably within a range of 10 to 120 minutes, more preferably within a range of 20 to 90 minutes, and still more preferably within a range of 30 to 90 minutes. The obtained composite resin composition is preferably cooled to normal temperature (within a range of 5 to 35° C.) after the mixing step.

In the mixing step, CNF may be added to the resin emulsion, the resin emulsion may be added to CNF, or the resin emulsion and CNF may be brought into contact with each other by adding both of the resin emulsion and CNF to another container as long as the resin emulsion and CNF can be brought into contact with each other under the above-described temperature condition. From the viewpoint of producing the composite resin composition easily, the mixing step preferably includes a step of adding, to one (to which the other one is to be added) of the water dispersion liquid containing the cellulose nanofiber, and the resin emulsion, the other one (which is to be added to the one) under a condition such that a temperature of the one (to which the other one is to be added) of the water dispersion liquid and the resin emulsion is 50° C. or higher. On this occasion, the temperature of the other one (which is to be added to the one) is more preferably also set in such a way as to be under a condition of 50° C. or higher from the viewpoint of further enhancing the dispersibility of CNF in the composite resin composition.

For example, when the one (to which the other one is to be added) is the water dispersion liquid containing CNF, and the other one (which is added to the one) is the resin emulsion, in other words, when the resin emulsion is added to the water dispersion liquid containing CNF, the following method can be adopted. That is, the method for producing a composite resin composition in that case further includes a heating step of heating the water dispersion liquid containing CNF to 50° C. or higher prior to the mixing step, and the mixing step can include a step of adding the resin emulsion to the water dispersion liquid containing CNF and having been heated to 50° C. or higher through the heating step.

In addition, for example, when the one (to which the other one is to be added) is the resin emulsion, and the other one (which is added to the one) is the water dispersion liquid containing CNF, in other words, when the water dispersion liquid containing CNF is added to the resin emulsion, the following method can be adopted. That is, the method for producing a composite resin composition in that case further includes a heating step of heating the resin emulsion to 50° C. or higher prior to the mixing step, and the mixing step can include a step of adding the water dispersion liquid containing CNF to the resin emulsion having been heated to 50° C. or higher through the heating step.

With respect to the resin emulsion that is used in the method for producing a composite resin composition, a resin emulsion produced in a part of the method for producing a composite resin composition may be used, or a resin emulsion produced in advance, such as a resin emulsion which have been produced in advance, or a resin emulsion purchased from the market, may be prepared and used. The resin emulsion produced in advance can be produced through, for example, a polymerization step, which will be mentioned later, in the method for producing a composite resin composition.

Further, in the method for producing a composite resin composition, when the one (to which the other one is to be added) is the resin emulsion, and the other one (which is added to the one) is the water dispersion liquid containing CNF, the resin emulsion, which is the object of adding CNF, can be produced prior to the mixing step. That is, the method for producing a composite resin composition in this case can further include a polymerization step of subjecting the monomer components for forming the resin particle to emulsion polymerization under a condition of a temperature of 50° C. or higher, thereby obtaining the resin emulsion prior to the mixing step. In this case, the mixing step preferably includes, following the polymerization step, a step of adding the above-mentioned water dispersion liquid containing CNF to the resin emulsion obtained in the polymerization step and having a temperature of 50° C. or higher. As described herein, when the temperature of the resin emulsion is set to the condition of 50° C. or higher, enhancing the production efficiency can also be expected by utilizing the heat of polymerization of the monomer components for forming the resin particle.

The water dispersion liquid containing CNF, which is to be used in the mixing step to be performed following the polymerization step, may contain monomer components (remaining monomer components) for forming the resin particle together with the monomer components used in the polymerization step, and an emulsifier. Further, in the mixing step, the water dispersion liquid containing CNF, and a pre-emulsion containing the monomer components (remaining monomer components), an emulsifier, and water may be added separately to the resin emulsion obtained in the polymerization step. As used in these methods, the monomer components may also be used in the mixing step to further polymerize the monomer components by adding the monomer components to the resin emulsion obtained in the polymerization step. Furthermore, the water dispersion liquid containing CNF may contain the above-mentioned cellulose-based polymer compound.

In the polymerization step, the resin emulsion is preferably obtained by subjecting one, or two or more polymerizable monomers (monomer components) for forming the resin particle to emulsion polymerization in an aqueous medium, such as water, which is to be the aqueous dispersion medium. Specifically, the monomer components for forming the resin particle are preferably subjected to emulsion polymerization in the aqueous medium (preferably water) in the presence of a polymerization initiator, a surfactant (emulsifier), and the like. Examples of the emulsion polymerization method include a method of mixing the aqueous medium, the monomer components, the polymerization initiator and the like simultaneously to perform emulsion polymerization, and a method of performing emulsion polymerization using a pre-emulsion containing the aqueous medium, the monomer components and the like. More specifically, the monomer components are more preferably subjected to emulsion polymerization in the aqueous medium by dropping each of the pre-emulsion prepared by mixing the aqueous medium, the monomer components, and the like in advance, and the polymerization initiator to the aqueous medium prepared separately.

The polymerization temperature during the emulsion polymerization is, as mentioned above, set to a condition of 50° C. or higher, preferably set to a condition of 55° C. or higher, more preferably 60° C. or higher, and still more preferably 70° C. or higher, and is preferably set to a condition of 100° C. or lower. The polymerization time during the emulsion polymerization, and the types, the use amounts, and the like of the polymerization initiator, the emulsifier, and the like to be used can appropriately be determined within the same range as in conventionally known emulsion polymerization. For example, the polymerization time is preferably within a range of about 1 to about 15 hours. In addition, the above-mentioned pre-emulsion and method of adding (dropping) the polymerization initiator are not particularly limited; for example, the methods such as a simultaneous addition method, a continuous addition method, and a multi-stage addition method can be adopted; and these addition methods may appropriately be combined.

Examples of the polymerization initiator include peroxides, such as a persulfate, an organic peroxide, and hydrogen peroxide, and azo compounds, and one, or two or more polymerization initiators ca be used. In addition, a redox polymerization initiator in which a peroxide is used together, and as a polymerization accelerator, one, or two or more reducing agents can also be used.

Specific examples of the persulfate include potassium persulfate, sodium persulfate, and ammonium persulfate. Specific examples of the organic peroxide include: diacyl peroxides, such as benzoyl peroxide and dilauroyl peroxide; dialkyl peroxides, such as t-butyl cumyl peroxide and dicumyl peroxide; peroxy esters, such as t-butyl peroxylaurate and t-butyl peroxy benzoate; and hydroperoxides, such as cumene hydroperoxide and t-butyl hydroperoxide. Specific examples of the azo compounds include 2,2'-azobis(2-amidinopropane) dihydrochloride and 4,4'-azobis(4-cyanopentanoic acid). Specific examples of the reducing agents include ascorbic acid and salts thereof, tartaric acid and salts thereof, sulfurous acid and salts thereof, bisulfite and salts thereof, thiosulfuric acid and salts thereof, and iron (II) salts.

When the resin particle is synthesized, a known chain transfer agent may be used in order to adjust the molecular weight of the resin particle. For example, alkyl mercaptans, such as hexyl mercaptan, lauryl mercaptan, octyl mercaptan, and n- or t-dodecyl mercaptan, and the like each can be used as the chain transfer agent.

Examples of the emulsifier (surfactant) that can be used when the resin particle is synthesized include an anionic surfactant, a nonionic surfactant, a cationic surfactant, and an amphoteric surfactant, and one, or two or more emulsifiers can be used. As the emulsifier, an anionic surfactant and a nonionic surfactant are preferable, and the emulsifier is more preferably an anionic surfactant.

Examples of the anionic surfactant include: fatty acid salts, such as sodium stearate; alkyl sulfate ester salts, such as sodium lauryl sulfate; polyoxyalkylene alkyl ether sulfate ester salts, such as a sodium polyoxyethylene alkyl ether sulfate; alkyl benzene sulfonic acid salts, such as sodium dodecylbenzene sulfonate; sodium dialkyl sulfosuccinates; sodium alkyl diphenyl ether disulfonates; and reactive anionic surfactants, such as polyoxyalkylene alkenyl ether ammonium sulfates and polyoxyethylene styrenated propenyl phenyl ether ammonium sulfate. Examples of the nonionic surfactant include: polyoxyethylene alkyl ethers, such as polyoxyethylene lauryl ether, polyoxyethylene stearyl ether, and polyoxyethylene oleyl ether; polyoxyalkylene derivatives, such as polyoxyalkylene alkyl ethers; and reactive nonionic surfactants, such as polyoxyalkylene alkenyl ethers and polyoxyethylene styrenated propenyl phenyl ether.

It is preferable that after the resin particle is obtained through the polymerization step, more preferably further after the mixing step is performed, the obtained composite resin composition be neutralized with a neutralizer. When the resin particle has a carboxy group, the carboxy group is preferably neutralized with a basic neutralizer. The composite resin composition is neutralized by the neutralization. Examples of the neutralizer include, but not particularly limited to: alkali metal compounds, such as sodium hydroxide and potassium hydroxide; alkali earth metal compounds, such as calcium hydroxide and calcium carbonate; ammonia; and organic amines, such as monomethylamine, dimethylamine, trimethylamine, monoethylamine, diethylamine, triethylamine, monoethanolamine, diethanolamine, triethanolamine, ethylenediamine, and diethylenetriamine, and one, or two or more thereof can be used.

As mentioned above in detail, the composite resin composition of one embodiment of the present invention contains the above-mentioned resin particle, CNF, and aqueous dispersion medium, wherein when a sample (non-film dry sample) obtained under the previously mentioned condition is observed with AFM, a structure such that an aggregate containing CNF is unlikely to be ascertained, CNF is dispersed, and the resin particles cling in the form of particles to the CNF is observed. In addition, the composite resin composition that is obtained by the production method of one embodiment of the present invention is obtained by adding CNF, under a condition that the temperature of the resin emulsion is 50° C. or higher, to the resin emulsion in which the resin particle is emulsified in the aqueous dispersion medium.

Therefore, with those composite resin compositions, a shaped product, such as a film, in which CNF is dispersed in the resin in a sufficiently uniform manner, and a wrinkle and a crack are unlikely to occur can be formed. As a result, it can be expected that with those composite resin compositions, a shaped product, such as a film, in which the tensile strength is enhanced more than in shaped products, such as films, which are obtained from composite resin compositions which are the same as the composite resin compositions of the present invention, except that CNF is not contained. Further, CNF has characteristics that it has high water-holding capability and is dried gently, and has a small linear thermal expansion coefficient, and therefore it can be expected that the contraction due to drying when a film is formed is suppressed more than in resin compositions which are the same as the composite resin compositions of the present invention, except that CNF is not contained. With respect to the film-forming capability, according to the composite resin compositions, a film in which the number of cracks is small, and CNF is dispersed in the resin in a sufficiently uniform manner can be formed even under a condition such that drying is performed gently at about normal temperature without using a heat press. It is considered that this is because not only CNF but also the resin particle is dispersed (emulsified) uniformly at a high level in the composite resin compositions.

Further, the composite resin composition of one embodiment of the present invention and the composite resin composition that is obtained by the production method of one embodiment of the present invention are also capable of forming a shaped product, sch as a film, having a high gel fraction. Therefore, it can also be expected that with those composite resin compositions, a shaped product, such as a film, in which the solvent resistance that is improved more than in shaped products, such as films, which are obtained from resin compositions which are the same as the composite resin compositions of the present invention, except that CNF is not contained.

It is to be noted that the composite resin composition of one embodiment of the present invention can have the constitution as follows.

[1] A composite resin composition containing: an aqueous dispersion medium; a resin particle emulsified in the aqueous dispersion medium; and a cellulose nanofiber dispersed in the aqueous dispersion medium, wherein the resin particle contains at least one selected from the group consisting of a (meth)acrylic resin particle, a styrene-based resin particle, and a (meth)acrylonitrile-based resin particle, and when a sample obtained in such a way that a liquid obtained by diluting the composite resin composition with water in an amount that allows a non-volatile content of the composite resin composition to fall within a range of 0.01 to 0.1% by mass is dropped onto a base material for measurement and is dried is observed with an atomic force microscope, a structure such that the cellulose nanofiber is dispersed, and the resin particles cling in the form of particles to the cellulose nanofiber is observed.

[2] The composite resin composition according to [1], wherein in the observation with the atomic force microscope, a structure such that when the cellulose nanofiber is assumed to be an axis, the resin particles gather along and around the axis in the form of a bunch of grapes is observed.

[3] The composite resin composition according to [1] or [2], wherein a content of the cellulose nanofiber in the composite resin composition is within a range of 0.1 to 10 parts by mass per 100 parts by mass of the resin particle in the composite resin composition.

[4] The composite resin composition according to any one of [1] to [3], wherein the resin particle further contains a structural unit derived from at least one polymerizable monomer selected from the group consisting of an unsaturated carboxylic acid-based monomer and a (meth)acrylamide-based monomer.

Further, the method for producing a composite resin composition of one embodiment of the present invention can have the constitution as follows.

[5] A method for producing a composite resin composition, including a mixing step of bringing a resin emulsion in which at least one resin particle selected from the group consisting of a (meth)acrylic resin particle, a styrene-based resin particle, and a (meth)acrylonitrile-based resin particle is emulsified in an aqueous dispersion medium, and a cellulose nanofiber into contact with each other under a condition of a temperature of 50° C. or higher, thereby mixing the resin emulsion and the cellulose nanofiber, wherein the composite resin composition containing: the aqueous dispersion medium; the resin particle emulsified in the aqueous dispersion medium; and the cellulose nanofiber dispersed in the aqueous dispersion medium is obtained through the mixing step.

[6] The method for producing a composite resin composition according to [5], wherein the mixing step includes a step of adding, to one of a water dispersion liquid containing the cellulose nanofiber, and the resin emulsion, the other one under a condition such that a temperature of the one is 50° C. or higher.

[7] The method for producing a composite resin composition according to [6], wherein the mixing step includes a step of adding the other one to the one under a condition such that a temperature of the other one is also 50° C. or higher.

[8] The method for producing a composite resin composition according to [6] or [7], wherein the one is the water dispersion liquid containing the cellulose nanofiber, and the other one is the resin emulsion, the method further includes a heating step of heating the water dispersion liquid containing the cellulose nanofiber to 50° C. or higher prior to the mixing step, and the mixing step includes a step of adding the resin emulsion to the water dispersion liquid containing the cellulose nanofiber, the water dispersion liquid heated to 50° C. or higher through the heating step.

[9] The method for producing a composite resin composition according to [6] or [7], wherein the one is the resin emulsion, and the other one is the water dispersion liquid containing the cellulose nanofiber, the method further includes a heating step of heating the resin emulsion to 50° C. or higher prior to the mixing step, and the mixing step includes a step of adding the water dispersion liquid containing the cellulose nanofiber to the resin emulsion heated to 50° C. or higher through the heating step.

[10] The method for producing a composite resin composition according to [6] or [7], wherein the one is the resin emulsion, and the other one is the water dispersion liquid containing the cellulose nanofiber, the method further includes a polymerization step of subjecting monomer components for forming the resin particle to emulsion polymerization under a condition of a temperature of 50° C. or higher prior to the mixing step, thereby obtaining the resin emulsion, and the mixing step includes, following the polymerization step, a step of adding the water dispersion liquid containing the cellulose nanofiber to the resin emulsion obtained in the polymerization step and having a temperature of 50° C. or higher.

EXAMPLES

Hereinafter, further specific examples of the aforementioned one embodiment will be described giving Examples and Comparative Examples, but the present invention is not limited to the following Examples.

Production Examples A for Resin Compositions

In Examples 1 to 11 below, a resin emulsion produced in advance was used, and the resin emulsion and a cellulose nanofiber (CNF) were brought into contact with each other under a particular temperature condition to mix the resin emulsion and the cellulose nanofiber, thereby producing a composite resin composition. Specifically, in Examples 1 to 8, the resin emulsion was heated to a particular temperature, and a water dispersion liquid (about 20° C.) containing CNF was then added to the resin emulsion, and in Example 9, a condition such that the water dispersion liquid containing CNF at the time when it was added to the resin emulsion was also heated to a particular temperature was adopted. In Example 10, the water dispersion liquid containing CNF was heated to a particular temperature, and the resin emulsion (about 20° C.) was then added to the water dispersion liquid, and in Example 11, a condition such that the resin emulsion at the time when it was added to the water dispersion liquid containing CNF was also heated to a particular temperature was adopted. It is to be noted that the composition of the monomer components for forming each resin was adjusted in such a way that the glass transition temperature (Tg; theoretical value) of each resin (polymer) was the same in each Example for the purpose of making it easy to perform relative evaluation.

Preparation Example 1

In a four-necked separable flask to which a stirrer, a thermometer, a reflux condenser, and a dropping funnel were attached, 53.5 parts by mass of deionized water was charged, and the internal temperature was raised to 80° C. while the deionized water was being stirred.

On the other hand, separately from the separable flask, monomer components (the total amount of which was 100 parts by mass) consisting of 42.9 parts by mass of n-butyl acrylate (hereinafter, sometimes written as "BA"), 54.6 parts by mass of methyl methacrylate (hereinafter, sometimes written as "MMA"), 2.0 parts by mass of acrylic acid (hereinafter, sometimes written as "AAc"), and 0.5 parts by mass of acrylamide (hereinafter, sometimes written as "AM"), 2.0 parts by mass of polyoxyethylene styrylphenyl ether ammonium sulfate (6.7 parts by mass of trade name "LATEMUL E-1000A" (having a solid content of 30% by mass) manufactured by Kao Corporation) as an anionic emulsifier, and 38.0 parts by mass of deionized water were emulsified with a homodisper to prepare a pre-emulsion.

Next, into deionized water in the separable flask, the prepared pre-emulsion was dropped uniformly from the dropping funnel in 3 hours, and simultaneously, 6.0 parts by mass of a 5% by mass ammonium persulfate aqueous solution was dropped uniformly in 3 hours while the internal temperature in the separable flask was being kept at 80° C. After the dropping of the pre-emulsion and the aqueous solution was completed, aging was performed at 80° C. for 3 hours to complete the reaction (polymerization). Subsequently, cooling was performed to room temperature (23±2° C.), and 1.0 part by mass of 25% by mass ammonia water was then added to perform neutralization and adjust pH to obtain a resin emulsion (non-volatile content: about 50% by mass) containing a (meth)acrylic resin particle. It is to be noted that Tg (theoretical value) of the (meth)acrylic resin particle in this resin emulsion is 15° C.

Comparative Example 1

In Comparative Example 1, the resin emulsion obtained in Preparation Example 1 was used as it was as the resin composition of Comparative Example 1. In Examples 1 to 7 and 9 to 11, and Comparative Examples 2 to 7 below, the resin emulsion obtained in Preparation Example 1 was used for producing a composite resin composition.

Example 1

In a four-necked separable flask to which a stirrer, a thermometer, a reflux condenser, and a dropping funnel were attached, the resin emulsion obtained in Preparation Example 1 was placed, and the temperature was raised to 80° C. In a state where the resin emulsion in the separable flask was kept at 80° C., 133 parts by mass (1.0 part by mass as CNF) of a water dispersion liquid containing mechanical defibration type CNF (CNF by an ACC method) (a liquid obtained by diluting trade name "nanoforest-S (BB-C)" (having a solid content of 1.2% by mass) manufactured by Chuetsu Pulp & Paper Co., Ltd. with deionized water in such a way that the solid content was 0.75% by mass) was dropped uniformly into the resin emulsion from the dropping funnel in 1 hour. After the dropping was completed, cooling was performed to room temperature (23±2° C.), and a resultant liquid was filtrated using 120-mesh filter cloth to obtain a composite resin composition containing CNF.

In this way, the composite resin composition containing water, a (meth)acrylic resin particle, and 1 part by mass of mechanical defibration type CNF based on 100 parts by mass of the resin particle (the monomer components which formed the resin particle) was produced.

Example 2

A composite resin composition containing CNF was produced by the same method as in Example 1, except that the temperature condition of the resin emulsion at the time when the water dispersion liquid containing CNF was added to the resin emulsion was changed to 60° C.

Example 3

A composite resin composition containing CNF was produced by the same method as in Example 1, except that the temperature condition of the resin emulsion at the time when the water dispersion liquid containing CNF was added to the resin emulsion was changed to 50° C.

Example 4

A composite resin composition containing CNF was obtained by the same method as in Example 1, except that the addition amount of the water dispersion liquid containing CNF was changed to 400 parts by mass (3.0 parts by mass as CNF). In this way, the composite resin composition containing water, a (meth)acrylic resin particle, and 3 parts by mass of mechanical defibration type CNF based on 100 parts by mass of the resin particle (the monomer components which formed the resin particle) was produced.

Example 5

A composite resin composition containing CNF was obtained by the same method as in Example 1, except that the addition amount of the water dispersion liquid containing CNF was changed to 667 parts by mass (5.0 parts by mass as CNF). In this way, the composite resin composition containing water, a (meth)acrylic resin particle, and 5 parts by mass of mechanical defibration type CNF based on 100 parts by mass of the resin particle (the monomer components which formed the resin particle) was produced.

Example 6

A composite resin composition containing CNF was obtained by the same method as in Example 1, except that 133 parts by mass of the water dispersion liquid containing mechanical defibration type CNF, which was used in Example 1, was changed to 133 parts by mass (1.0 part by mass as CNF) of a water dispersion liquid containing chemical defibration type CNF (a liquid obtained by diluting trade name "cellenpia" (TEMPO-oxidized CNF standard product; having a solid content of 1.0% by mass) manufactured by Nippon Paper Industries Co., Ltd. with deionized water in such a way that the solid content was 0.75% by mass). In this way, the composite resin composition containing water, a (meth)acrylic resin particle, and 1 part by mass of chemical defibration type CNF based on 100 parts by mass of the resin particle (the monomer components which formed the resin particle) was produced.

Example 7

A composite resin composition containing CNF was obtained by the same method as in Example 1, except that 133 parts by mass of the water dispersion liquid containing mechanical defibration type CNF, which was used in Example 1, was changed to 133 parts by mass (1.0 part by mass as CNF) of a water dispersion liquid containing chemical defibration type CNF (a liquid obtained by diluting trade name "cellenpia" (TEMPO-oxidized CNF short fiber product; having a solid content of 5.0% by mass) manufactured by Nippon Paper Industries Co., Ltd. with deionized water in such a way that the solid content was 0.75% by mass). In this way, the composite resin composition containing water, a (meth)acrylic resin particle, and 1 part by mass of chemical defibration type CNF based on 100 parts by mass of the resin particle (the monomer components which formed the resin particle) was produced.

Example 8

Firstly, a resin emulsion (non-volatile content: about 50% by mass) containing a (meth)acrylic resin particle (Tg (theoretical value): 15° C.) was obtained by the same method as in Preparation Example 1, except that the use amount of the anionic emulsifier used in Preparation Example 1 was changed to 1.9 parts by mass of polyoxyethylene styrylphenyl ether ammonium sulfate (6.3 parts by mass of trade name "LATEMUL E-1000A" (having a solid content of 30% by mass) manufactured by Kao Corporation). Further, 133 parts by mass (1.0 part by mass as CNF) of a water dispersion liquid containing mechanical defibration type CNF (CNF by an ACC method) (a liquid obtained by diluting trade name "nanoforest-S (BB-C)" (having a solid content of 1.2% by mass) manufactured by Chuetsu Pulp & Paper Co., Ltd. with deionized water in such a way that the solid content was 0.75% by mass), 0.1 parts by mass of polyoxyethylene styrylphenyl ether ammonium sulfate (0.3 parts by mass of trade name "LATEMUL E-1000A" (having a solid content of 30% by mass) manufactured by Kao Corporation) as an anionic emulsifier, and 1.0 part by mass of carboxymethyl cellulose (CMC) (trade name "CELLOGEN 6A" (having a solid content of 100% by mass) manufactured by DKS Co., Ltd.) were mixed to obtain a water dispersion liquid containing CNF.

Next, in a four-necked separable flask to which a stirrer, a thermometer, a reflux condenser, and a dropping funnel were attached, the resin emulsion obtained above was placed, and the temperature was raised to 80° C. In a state where the resin emulsion in the separable flask was kept at 80° C., the water dispersion liquid containing CNF, which was obtained above, was dropped uniformly into the resin emulsion from the dropping funnel in 1 hour. After the dropping was completed, cooling was performed to room temperature (23±2° C.), and a resultant liquid was filtrated using 120-mesh filter cloth to obtain a composite resin composition containing CNF.

In this way, the composite resin composition containing water, a (meth)acrylic resin particle, and 1 part by mass of mechanical defibration type CNF and 1 part by mass of CMC based on 100 parts by mass of the resin particle (the monomer components which formed the resin particle) was produced.

Example 9

A composite resin composition containing CNF was obtained by the same method as in Example 1, except that the water dispersion liquid containing CNF had also been heated to 80° C. before the water dispersion liquid containing CNF was added to the resin emulsion, and the water dispersion liquid of 80° C., containing CNF, was added to the resin emulsion of 80° C.

Example 10

In a four-necked separable flask to which a stirrer, a thermometer, a reflux condenser, and a dropping funnel were attached, 133 parts by mass (1.0 part by mass as CNF) of a water dispersion liquid containing mechanical defibration type CNF (CNF by an ACC method) (a liquid obtained by diluting trade name "nanoforest-S (BB-C)" (having a solid content of 1.2% by mass) manufactured by Chuetsu Pulp & Paper Co., Ltd. with deionized water in such a way that the solid content was 0.75% by mass) was placed, and the temperature was raised to 80° C. In a state where the inside of the separable flask was kept at 80° C., the resin emulsion obtained in Preparation Example 1 was dropped uniformly into the water dispersion liquid containing CNF, which was in the flask, from the dropping funnel in 1 hour. After the dropping was completed, cooling was performed to room temperature (23±2° C.), and a resultant liquid was filtrated using 120-mesh filter cloth to obtain a composite resin composition containing CNF.

In this way, the composite resin composition containing water, a (meth)acrylic resin particle, and 1 part by mass of mechanical defibration type CNF based on 100 parts by mass of the resin particle (the monomer components which formed the resin particle) was produced.

Example 11

A composite resin composition containing CNF was obtained by the same method as in Example 10, except that the resin emulsion had also been heated to 80° C. before the resin emulsion was added to the water dispersion liquid containing CNF, and the resin emulsion of 80° C. was added to the water dispersion liquid of 80° C., containing CNF.

Comparative Example 2

A composite resin composition containing CNF was obtained by the same method as in Example 1, except that the temperature condition of the resin emulsion at the time when the water dispersion liquid containing CNF was added to the resin emulsion was changed to 45° C.

Comparative Example 3

A composite resin composition containing CNF was obtained by the same method as in Example 1, except that the temperature condition of the resin emulsion at the time when the water dispersion liquid containing CNF was added to the resin emulsion was changed to 40° C.

Comparative Example 4

A composite resin composition containing CNF was obtained by the same method as in Example 1, except that the temperature condition of the resin emulsion at the time when the water dispersion liquid containing CNF was added to the resin emulsion was changed to 20° C.

Comparative Example 5

A composite resin composition containing CNF was obtained by the same method as in Example 1, except that the temperature condition of the resin emulsion at the time when the water dispersion liquid containing CNF was added to the resin emulsion was changed to 20° C. and that the addition amount of the water dispersion liquid containing CNF was changed to 400 parts by mass (3.0 parts by mass as CNF).

Comparative Example 6

A composite resin composition containing CNF was obtained by the same method as in Example 1, except that the temperature condition of the resin emulsion at the time when the water dispersion liquid containing CNF was added to the resin emulsion was changed to 20° C. and that the addition amount of the water dispersion liquid containing CNF was changed to 667 parts by mass (5.0 parts by mass as CNF).

Comparative Example 7

A composite resin composition containing CNF was obtained by the same method as in Example 10, except that the temperature of the water dispersion liquid containing CNF was not raised to make a state where the temperature was kept at about 20° C. at the time when the resin emulsion was added to the water dispersion liquid containing CNF in Example 10.

Production Examples B for Resin Compositions

In Examples 12 to 24 below, following the step of subjecting the monomer components for forming the resin particle to emulsion polymerization under a particular temperature condition, thereby obtaining a resin emulsion, a water dispersion liquid (about 20° C.) containing CNF was added to the resin emulsion (without cooling the resin emulsion), thereby producing a composite resin composition in which CNF was made into a composite with the resin emulsion. It is to be noted that the composition of the monomer components for forming each resin was adjusted in such a way that the glass transition temperature (Tg; theoretical value) of each resin (polymer) was the same in each Example for the purpose of making it easy to perform relative evaluation.

Example 12

In a four-necked separable flask to which a stirrer, a thermometer, a reflux condenser, and a dropping funnel were attached, 53.5 parts by mass of deionized water was charged, and the internal temperature was raised to 80° C. while the deionized water was being stirred.

On the other hand, separately from the separable flask, monomer components (the total amount of which was 100 parts by mass) consisting of 42.9 parts by mass of n-butyl acrylate (BA), 54.6 parts by mass of methyl methacrylate (MMA), 2.0 parts by mass of acrylic acid (AAc), and 0.5 parts by mass of acrylamide (AM), 2.0 parts by mass of polyoxyethylene styrylphenyl ether ammonium sulfate (6.7 parts by mass of trade name "LATEMUL E-1000A" (having a solid content of 30% by mass) manufactured by Kao Corporation) as an anionic emulsifier, and 38.0 parts by mass of deionized water were emulsified with a homodisper to prepare a pre-emulsion.

Next, into deionized water in the separable flask, the prepared pre-emulsion was dropped uniformly from the dropping funnel in 3 hours, and simultaneously, 6.0 parts by mass of a 5% by mass ammonium persulfate aqueous solution was dropped uniformly in 3 hours while the internal temperature in the separable flask was being kept at 80° C. Immediately after the dropping of the pre-emulsion and the aqueous solution was completed, 133 parts by mass (1.0 part by mass as CNF) of a water dispersion liquid containing mechanical defibration type CNF (CNF by an ACC method) (a liquid obtained by diluting trade name "nanoforest-S (BB-C)" (having a solid content of 1.2% by mass) manufactured by Chuetsu Pulp & Paper Co., Ltd. with deionized water in such a way that the solid content was 0.75% by mass) was dropped uniformly into the separable flask from the dropping funnel in 1 hour, and aging was performed at 80° C. for 3 hours leaving a resultant mixture as it was. After that, cooling was performed to room temperature (23±2° C.), and a liquid obtained by adding 1.0 part by mass of 25% by mass ammonia water to perform neutralization and adjust pH was filtrated using 120-mesh filter cloth to obtain a composite resin composition.

In this way, the composite resin composition containing water, a (meth)acrylic resin particle, and 1 part by mass of mechanical defibration type CNF based on 100 parts by mass of the resin particle (the monomer components which formed the resin particle) was produced. Tg (theoretical value) of the (meth)acrylic resin particle in this resin composition is 15° C.

Example 13

A composite resin composition containing CNF was obtained by the same method as in Example 12, except that the addition amount of the water dispersion liquid containing CNF was changed to 66.7 parts by mass (0.5 parts by mass as CNF). In this way, the composite resin composition containing water, a (meth)acrylic resin particle, and 0.5 parts by mass of mechanical defibration type CNF based on 100 parts by mass of the resin particle (the monomer components which formed the resin particle) was produced.

Example 14

A composite resin composition containing CNF was obtained by the same method as in Example 12, except that the addition amount of the water dispersion liquid containing CNF was changed to 100 parts by mass (0.75 parts by mass as CNF). In this way, the composite resin composition containing water, a (meth)acrylic resin particle, and 0.75 parts by mass of mechanical defibration type CNF based on 100 parts by mass of the resin particle (the monomer components which formed the resin particle) was produced.

Example 15

A composite resin composition containing CNF was obtained by the same method as in Example 12, except that the addition amount of the water dispersion liquid containing CNF was changed to 400 parts by mass (3.0 parts by mass as CNF). In this way, the composite resin composition containing water, a (meth)acrylic resin particle, and 3 parts by mass of mechanical defibration type CNF based on 100 parts by mass of the resin particle (the monomer components which formed the resin particle) was produced.

Example 16

A composite resin composition containing CNF was obtained by the same method as in Example 12, except that the addition amount of the water dispersion liquid containing CNF was changed to 667 parts by mass (5.0 parts by mass as CNF). In this way, the composite resin composition containing water, a (meth)acrylic resin particle, and 5 parts by mass of mechanical defibration type CNF based on 100 parts by mass of the resin particle (the monomer components which formed the resin particle) was produced.

Example 17

A composite resin composition containing CNF was obtained by the same method as in Example 12, except that 133 parts by mass of the water dispersion liquid containing mechanical defibration type CNF, which was used in Example 12, was changed to 133 parts by mass (1.0 part by mass as CNF) of a water dispersion liquid containing chemical defibration type CNF (a liquid obtained by diluting trade name "cellenpia" (TEMPO-oxidized CNF standard product; having a solid content of 1.0% by mass) manufactured by Nippon Paper Industries Co., Ltd. with deionized water in such a way that the solid content was 0.75% by mass). In this way, the composite resin composition containing water, a (meth)acrylic resin particle, and 1 part by mass of chemical defibration type CNF based on 100 parts by mass of the resin particle (the monomer components which formed the resin particle) was produced.

Example 18

A composite resin composition containing CNF was obtained by the same method as in Example 12, except that 133 parts by mass of the water dispersion liquid containing mechanical defibration type CNF, which was used in Example 12, was changed to 133 parts by mass (1.0 part by mass as CNF) of a water dispersion liquid containing chemical defibration type CNF (a liquid obtained by diluting trade name "cellenpia" (TEMPO-oxidized CNF short fiber product; having a solid content of 5.0% by mass) manufactured by Nippon Paper Industries Co., Ltd. with deionized water in such a way that the solid content was 0.75% by mass). In this way, the composite resin composition containing water, a (meth)acrylic resin particle, and 1 part by mass of chemical defibration type CNF based on 100 parts by mass of the resin particle (the monomer components which formed the resin particle) was produced.

Example 19

In a four-necked separable flask to which a stirrer, a thermometer, a reflux condenser, and a dropping funnel were attached, 53.5 parts by mass of deionized water was charged, and the internal temperature was raised to 60° C. while the deionized water was being stirred.

On the other hand, separately from the separable flask, monomer components (the total amount of which was 100 parts by mass) consisting of 42.9 parts by mass of n-butyl acrylate (BA), 54.6 parts by mass of methyl methacrylate (MMA), 2.0 parts by mass of acrylic acid (AAc), and 0.5 parts by mass of acrylamide (AM), 2.0 parts by mass of polyoxyethylene styrylphenyl ether ammonium sulfate (6.7 parts by mass of trade name "LATEMUL E-1000A" (having a solid content of 30% by mass) manufactured by Kao Corporation) as an anionic emulsifier, and 38.0 parts by mass of deionized water were emulsified with a homodisper to prepare a pre-emulsion.

Next, into deionized water in the separable flask, the prepared pre-emulsion was dropped uniformly from the dropping funnel in 3 hours, and simultaneously, 6.0 parts by mass of a 5% by mass ammonium persulfate aqueous solution and 2.5 parts by mass of a 10% by mass sodium hydrogen sulfite aqueous solution were dropped uniformly in 3 hours while the internal temperature in the separable flask was being kept at 60° C. Immediately after the dropping of the pre-emulsion and the aqueous solutions was completed, 133 parts by mass (1.0 part by mass as CNF) of a water dispersion liquid containing mechanical defibration type CNF (CNF by an ACC method) (a liquid obtained by diluting trade name "nanoforest-S (BB-C)" (having a solid content of 1.2% by mass) manufactured by Chuetsu Pulp & Paper Co., Ltd. with deionized water in such a way that the solid content was 0.75% by mass) was dropped uniformly into the separable flask from the dropping funnel in 1 hour, and aging was performed at 60° C. for 3 hours leaving a resultant mixture as it was. After that, cooling was performed to room temperature (23±2° C.), and a liquid obtained by adding 1.0 part by mass of 25% by mass ammonia water to perform neutralization and adjust pH was filtrated using 120-mesh filter cloth to obtain a composite resin composition.

In this way, a resin emulsion containing a (meth)acrylic resin particle with which 1 part by mass of the cellulose nanofiber based on 100 parts by mass of the monomer components was made into a composite was produced. That is, the composite resin composition containing water, the (meth)acrylic resin particle, and 1 part by mass of mechanical defibration type CNF based on 100 parts by mass of the resin particle (the monomer components which formed the resin particle) was produced. It is to be noted that Tg (theoretical value) of the (meth)acrylic resin particle in this resin emulsion is 15° C.

Example 20

A composite resin composition containing CNF was obtained by the same method as in Example 12, except that the monomer components (the total amount of which was 100 parts by mass) used in Example 12 were changed to monomer components (the total amount of which was 100 parts by mass) consisting of 42.3 parts by mass of n-butyl acrylate (BA), 27.6 parts by mass of methyl methacrylate (MMA), 27.6 parts by mass of styrene (hereinafter, sometimes written as "ST"), 2.0 parts by mass of acrylic acid (AAc), and 0.5 parts by mass of acrylamide (AM). In this way, the composite resin composition containing water, a (meth)acrylic resin particle, and 1 part by mass of mechanical defibration type CNF based on 100 parts by mass of the resin particle (the monomer components which formed the resin particle) was produced.

Example 21

A composite resin composition containing CNF was obtained by the same method as in Example 12, except that the monomer components (the total amount of which was 100 parts by mass) used in Example 12 were changed to monomer components (the total amount of which was 100 parts by mass) consisting of 42.2 parts by mass of n-butyl acrylate (BA), 45.5 parts by mass of methyl methacrylate (MMA), 9.8 parts by mass of acrylonitrile (hereinafter, sometimes written as "AN"), 2.0 parts by mass of acrylic acid (AAc), and 0.5 parts by mass of acrylamide (AM). In this way, the composite resin composition containing water, a (meth)acrylic resin particle, and 1 part by mass of mechanical defibration type CNF based on 100 parts by mass of the resin particle (the monomer components which formed the resin particle) was produced.

Example 22

A composite resin composition containing CNF was obtained by the same method as in Example 12, except that the monomer components (the total amount of which was 100 parts by mass) used in Example 12 were changed to monomer components (the total amount of which was 100 parts by mass) consisting of 41.9 parts by mass of n-butyl acrylate (BA), 6.8 parts by mass of methyl methacrylate (MMA), 48.8 parts by mass of styrene (ST), 2.0 parts by mass of acrylic acid (AAc), and 0.5 parts by mass of acrylamide (AM). In this way, the composite resin composition containing water, a styrene-based resin particle, and 1 part by mass of mechanical defibration type CNF based on 100 parts by mass of the resin particle (the monomer components which formed the resin particle) was produced.

Example 23

A composite resin composition containing CNF was obtained by the same method as in Example 12, except that the monomer components (the total amount of which was 100 parts by mass) used in Example 12 were changed to monomer components (the total amount of which was 100 parts by mass) consisting of 42.7 parts by mass of n-butyl acrylate (BA), 6.8 parts by mass of methyl methacrylate (MMA), 48.0 parts by mass of acrylonitrile (AN), 2.0 parts by mass of acrylic acid (AAc), and 0.5 parts by mass of acrylamide (AM). In this way, the composite resin composition containing water, a (meth)acrylonitrile-based resin particle, and 1 part by mass of mechanical defibration type CNF based on 100 parts by mass of the resin particle (the monomer components which formed the resin particle) was produced.

Example 24

A composite resin composition containing CNF was obtained by the same method as in Example 12, except that the monomer components (the total amount of which was 100 parts by mass) used in Example 12 were changed to monomer components (the total amount of which was 100 parts by mass) consisting of 42.5 parts by mass of n-butyl acrylate (BA) and 57.5 parts by mass of methyl methacrylate (MMA). In this way, the composite resin composition containing water, a (meth)acrylic resin particle, and 1 part by mass of mechanical defibration type CNF based on 100 parts by mass of the resin particle (the monomer components which formed the resin particle) was produced.

Comparative Example 8

A resin composition containing water and a (meth)acrylic resin particle but not containing CNF was produced by the same method as in Example 12, except that deionized water in place of the water dispersion liquid containing CNF in Example 12 was dropped in an amount equivalent to the amount of the water dispersion liquid from the dropping funnel in 1 hour.

Comparative Example 9

A resin composition containing water and a (meth)acrylic resin particle but not containing CNF was produced by the same method as in Example 19, except that deionized water in place of the water dispersion liquid containing CNF in Example 19 was dropped in an amount equivalent to the amount of the water dispersion liquid from the dropping funnel in 1 hour.

Comparative Example 10

In a four-necked separable flask to which a stirrer, a thermometer, a reflux condenser, and a dropping funnel were attached, 53.5 parts by mass of deionized water and 133 parts by mass (1.0 part by mass as CNF) of a water dispersion liquid containing mechanical defibration type CNF (CNF by an ACC method) (a liquid obtained by diluting trade name "nanoforest-S (BB-C)" (having a solid content of 1.2% by mass) manufactured by Chuetsu Pulp & Paper Co., Ltd. with deionized water in such a way that the solid content was 0.75% by mass) were charged, and the internal temperature was raised to 80° C. while a resultant mixture was being stirred.

On the other hand, separately from the separable flask, monomer components (the total amount of which was 100 parts by mass) consisting of 42.9 parts by mass of n-butyl acrylate (BA), 54.6 parts by mass of methyl methacrylate (MMA), 2.0 parts by mass of acrylic acid (AAc), and 0.5 parts by mass of acrylamide, 2.0 parts by mass of polyoxyethylene styrylphenyl ether ammonium sulfate (6.7 parts by mass of trade name "LATEMUL E-1000A" (having a solid content of 30% by mass) manufactured by Kao Corporation) as an anionic emulsifier, and 38.0 parts by mass of deionized water were emulsified with a homodisper to prepare a pre-emulsion.

Next, into the mixture of deionized water and the water dispersion liquid containing CNF in the separable flask, the prepared pre-emulsion was dropped uniformly from the dropping funnel in 3 hours, and simultaneously, 6.0 parts by mass of a 5% by mass ammonium persulfate aqueous solution was dropped uniformly in 3 hours while the internal temperature in the separable flask was being kept at 80° C. However, a lot of aggregates containing CNF were produced, and a composite resin composition was not able to be obtained.

Comparative Example 11

In a four-necked separable flask to which a stirrer, a thermometer, a reflux condenser, and a dropping funnel were attached, 91.5 parts by mass of deionized water was charged, and the internal temperature was raised to 80° C. while the deionized water was being stirred.

On the other hand, separately from the separable flask, monomer components (the total amount of which was 100 parts by mass) consisting of 42.9 parts by mass of n-butyl acrylate (BA), 54.6 parts by mass of methyl methacrylate (MMA), 2.0 parts by mass of acrylic acid (AAc), and 0.5 parts by mass of acrylamide, 2.0 parts by mass of polyoxyethylene styrylphenyl ether ammonium sulfate (6.7 parts by mass of trade name "LATEMUL E-1000A" (having a solid content of 30% by mass) manufactured by Kao Corporation) as an anionic emulsifier, and 133 parts by mass (1.0 part by mass as CNF) of a water dispersion liquid containing mechanical defibration type CNF (CNF by an ACC method) (a liquid obtained by diluting trade name "nanoforest-S (BB-C)" (having a solid content of 1.2% by mass) manufactured by Chuetsu Pulp & Paper Co., Ltd. with deionized water in such a way that the solid content was 0.75% by mass) were emulsified with a homodisper to prepare a pre-emulsion.

Next, into deionized water in the separable flask, the prepared pre-emulsion containing CNF was dropped uniformly from the dropping funnel in 3 hours, and simultaneously, 6.0 parts by mass of a 5% by mass ammonium persulfate aqueous solution was dropped uniformly in 3 hours while the internal temperature in the separable flask was being kept at 80° C. However, a lot of aggregates containing CNF were produced, and a composite resin composition was not able to be obtained.

(Evaluation Methods)

Measurement or evaluation of the non-volatile content, the viscosity, the dispersion state, the film appearance, the tensile strength, the degree of elongation, and the gel fraction was performed for the resin compositions obtained in respective Examples and Comparative Examples according to the methods which will be mentioned below.

(Non-Volatile Content)

The non-volatile content (solid content) (% by mass) of each resin composition was measured under a condition of a drying temperature of 140° C. and a drying time of 0.5 hours in accordance with the prescription in JIS K6828-1: 2003.

(Viscosity)

The viscosity (mPa·s) of each resin composition was measured under a condition of a revolving speed of 10 rpm and a temperature of 25° C. using a BH type rotary viscometer (BHII type Viscometer manufactured by Toki Sangyo Co., Ltd.) in accordance with the prescription in JIS K6833-1:2008.

(Dispersibility of CNF and Resin Particle)

Each produced resin composition was diluted 500 times by mass with water to adjust the non-volatile content within a range of 0.01 to 0.1% by mass and obtain a diluted liquid. A sample was prepared in such a way that this diluted liquid was dried in a glass desiccator, in which dry silica gel was charged, for 24 hours under an environment of a temperature of 23±2° C., where it was ascertained that when one drop (0.04 mL) of this diluted liquid was dropped onto a mica standard sample (manufactured by Hitachi High-Tech Science Corporation), which is a base material for measurement, the resin particle in the diluted liquid took a form of particle. This sample was observed using an atomic force microscope (AFM; trade name "AFM5100N" manufactured by Hitachi High-Technologies Corporation, and the dispersibility of CNF and the resin particle was evaluated according to the following evaluation criteria. It is to be noted that with respect to Comparative Examples 1, 8, and 9, CNF was not used, and therefore Comparative Examples 1, 8, and 9 were excluded from the objects of the present evaluation. In addition, as examples of the observation results with AFM, FIG. 1 shows respective observation images (observation images in a 50 μm square region and observation images in a 10 μm square region) obtained in Examples 1 and 5, and Comparative Example 4.

A: CNF is dispersed uniformly, an aggregate containing CNF is hardly observed, and a structure such that when CNF is assumed to be an axis, the resin particles gather at the periphery along the axis in the form of a bunch of grapes and cling to the axis is observed for almost all CNFs.

B: CNF is dispersed uniformly, an aggregate containing CNF is hardly observed, and a structure such that when CNF is assumed to be an axis, the resin particles gather at the periphery along the axis in the form of a bunch of grapes and cling to the axis is observed for some to the majority of CNFs.

C: An aggregate containing CNF is observed, and a structure such that the resin particles also aggregate accompanying the generation of the aggregate containing CNF is observed.

(Film Appearance)

A mixed liquid obtained by mixing 10 parts by mass of Texanol as a film-forming assistant with 100 parts by mass of each produced resin composition was applied on a release substrate and dried for 1 week under an environment of 23° C. and 50% RH to prepare a film having a length of about 210 mm, a width of about 90 mm, and a thickness of about 0.6 mm. The prepared film was observed visually, and the appearance of the film was evaluated according to the following evaluation criteria. As examples of the observation results of the film appearance, FIG. 2 shows photographs of respective films obtained in Examples 1 to 3, and Comparative Examples 1, 3, and 4.

A: A crack is hardly ascertained, CNF is dispersed uniformly, and an aggregate is hardly ascertained in the film.

B: Small cracks (cracks such that the total length of the cracks based on a long side of the film is 100% or less) are ascertained, but CNF is dispersed uniformly, and an aggregate is hardly ascertained in the film.

C: A crack is hardly ascertained, but an aggregate containing CNF is ascertained in the film.

D: Large cracks (cracks such that the total length of the cracks based on a long side of the film exceeds 100%) are ascertained in the film.

(Tensile Strength and Elongation)

A mixed liquid obtained by mixing 10 parts by mass of Texanol as a film-forming assistant with 100 parts by mass of each produced resin composition was dried for 1 week under an environment of 23° C. and 50% RH to prepare a film sample having a strip shape (the measurement part of which was about 40 mm in length, about 10 mm in width, and about 0.6 mm in thickness). A tensile test was performed on the film sample using a tensile tester (trade name "TENSILON Universal Testing Machine RTG-1210" manufactured by A&D Company, Limited) under a condition of 23° C. and a tensile speed of 300 mm/min to measure the tensile strength (MPa) and elongation (%).

(Gel Fraction)

Each produced resin composition was dried for 20 hours under an environment of 60° C. to prepare a film sample of about 20 mm square having a thickness of about 1 mm, and the mass $W_1$ (g) of this film sample was measured. This film sample was immersed in ethyl acetate and was left to stand for 20 hours under an environment of 23° C. and 50% RH. Thereafter, the film sample immersed in ethyl acetate was subjected to filtration using 200-mesh wire netting the mass $W_2$ (g) of which had been measured in advance to obtain an insoluble component on the wire netting. The insoluble component on the wire netting was dried for 6 hours under an environment of 80° C. to obtain a dried insoluble component on the wire netting. The total mass $W_3$ (g) of this wire netting and the dried insoluble component which adhered to and integrated with the wire netting was measured. The gel fraction was determined from the following equation.

Gel fraction (% by mass)=$((W_3-W_2)/W_1) \times 100$

Tables 1 to 6 show results of the above evaluations together with the amounts of monomers and CNF used in respective Examples and Comparative Examples. "Resin/CNF ratio" in the tables represents the content of CNF in each resin composition per 100 parts by mass of the resin particle (the total amount of the monomer components which constitute the resin particle) in the resin composition. In addition, in "Method of making composite" field in the tables, "Combination-(X° C.)" represents a method performed in Examples 1 to 11 and Comparative Examples 2 to 7, where a resin emulsion not containing CNF was first prepared as a base material, and a resultant product obtained by subjecting the resin emulsion to cooling (stopping the reaction) for the moment was used. Specifically, "Combination 1 (X° C.) (see Examples 1 to 8 and Comparative Examples 2 to 6) represents a method by adding a water dispersion liquid of about 20° C., containing CNF, to a resin emulsion of X° C., and "Combination 2 (X° C.) (see Example 9) represents a method by adding a water dispersion liquid of 80° C., containing CNF, to a resin emulsion of X° C. Similarly, "Combination 3 (X° C.)" (see Example 10 and Comparative Example 7) represents a method by adding a resin emulsion of about 20° C. to a water dispersion liquid of X° C., containing CNF, and "Combination 4 (X° C.)" (see Example 11) represents a method by adding a resin emulsion of 80° C. to a water dispersion liquid of X° C., containing CNF. In addition, "Reaction (X° C.)" (see Examples 12 to 24) represents a method in which a resin emulsion, which is a base, was prepared by polymerizing the monomer components at X° C., and a composite was made by adding CNF without cooling the resin emulsion.

TABLE 1

|  |  | Comparative Example 1 | Example 1 | Example 2 | Example 3 | Comparative Example 2 | Comparative Example 3 | Comparative Example 4 |
|---|---|---|---|---|---|---|---|---|
| Monomer components (parts by mass) | BA | 42.9 | 42.9 | 42.9 | 42.9 | 42.9 | 42.9 | 42.9 |
|  | MMA | 54.6 | 54.6 | 54.6 | 54.6 | 54.6 | 54.6 | 54.6 |
|  | ST |  |  |  |  |  |  |  |
|  | AN |  |  |  |  |  |  |  |
|  | AAc | 2.0 | 2.0 | 2.0 | 2.0 | 2.0 | 2.0 | 2.0 |
|  | AM | 0.5 | 0.5 | 0.5 | 0.5 | 0.5 | 0.5 | 0.5 |
|  | Total | 100 | 100 | 100 | 100 | 100 | 100 | 100 |
| Water dispersion liquid of mechanical defibration type CNF (parts by mass) |  |  | 133 | 133 | 133 | 133 | 133 | 133 |
| Water dispersion liquid of chemical defibration type CNF (standard) (parts by mass) |  |  |  |  |  |  |  |  |
| Water dispersion liquid of chemical defibration type CNF (short) (parts by mass) |  |  |  |  |  |  |  |  |
| Resin/CNF ratio |  | 100/0 | 100/1 | 100/1 | 100/1 | 100/1 | 100/1 | 100/1 |
| Method of making composite |  | — | Combination 1 (80° C.) | Combination 1 (60° C.) | Combination 1 (50° C.) | Combination 1 (45° C.) | Combination 1 (40° C.) | Combination 1 (20° C.) |
| Tg (theoretical value; ° C.) |  | 15 | 15 | 15 | 15 | 15 | 15 | 15 |
| Non-volatile content (% by mass) |  | 50 | 30 | 30 | 30 | 30 | 30 | 30 |
| Viscosity (mPa · s) |  | 4730 | 385 | 360 | 410 | 470 | 480 | 4730 |
| Dispersibility of CNF and resin particle |  | — | A | A | B | C | C | C |
| Film appearance |  | D | A | A | A | C | C | C |
| Tensile strength (MPa) |  | 2.61 | 6.53 | 6.00 | 6.24 | 6.10 | 6.12 | 3.88 |
| Elongation (%) |  | 302 | 300 | 290 | 264 | 180 | 164 | 103 |
| Gel fraction (% by mass) |  | 16.5 | 50.5 | 50.2 | 50.9 | 50.1 | 48.5 | 44.6 |

TABLE 2

|  |  | Example 4 | Comparative Example 5 | Example 5 | Comparative Example 6 | Example 6 | Example 7 |
|---|---|---|---|---|---|---|---|
| Monomer components (parts by mass) | BA | 42.9 | 42.9 | 42.9 | 42.9 | 42.9 | 42.9 |
|  | MMA | 54.6 | 54.6 | 54.6 | 54.6 | 54.6 | 54.6 |
|  | ST |  |  |  |  |  |  |
|  | AN |  |  |  |  |  |  |
|  | AAc | 2.0 | 2.0 | 2.0 | 2.0 | 2.0 | 2.0 |
|  | AM | 0.5 | 0.5 | 0.5 | 0.5 | 0.5 | 0.5 |
|  | Total | 100 | 100 | 100 | 100 | 100 | 100 |
| Water dispersion liquid of mechanical defibration type CNF (parts by mass) |  | 400 | 400 | 667 | 667 |  |  |
| Water dispersion liquid of chemical defibration type CNF (standard) (parts by mass) |  |  |  |  |  | 133 |  |
| Water dispersion liquid of chemical defibration type CNF (short) (parts by mass) |  |  |  |  |  |  | 133 |
| Resin/CNF ratio |  | 100/3 | 100/3 | 100/5 | 100/5 | 100/1 | 100/1 |
| Method of making composite |  | Combination 1 (80° C.) | Combination 1 (20° C.) | Combination 1 (80° C.) | Combination 1 (20° C.) | Combination 1 (80° C.) | Combination 1 (80° C.) |
| Tg (theoretical value; ° C.) |  | 15 | 15 | 15 | 15 | 15 | 15 |
| Non-volatile content (% by mass) |  | 15 | 15 | 10 | 10 | 25 | 25 |
| Viscosity (mPa · s) |  | 290 | 450 | 470 | 600 | 180 | 6 |
| Dispersibility of CNF and resin particle |  | B | C | B | C | A | A |
| Film appearance |  | A | C | A | C | A | B |
| Tensile strength (MPa) |  | 6.88 | 2.91 | 6.76 | 3.18 | 5.20 | 3.70 |
| Elongation (%) |  | 125 | 111 | 59 | 80 | 257 | 326 |
| Gel fraction (% by mass) |  | 52.2 | 48.2 | 62.9 | 55.5 | 38.5 | 43.3 |

TABLE 3

|  |  | Example 8 | Example 9 | Example 10 | Example 11 | Comparative Example 7 |
|---|---|---|---|---|---|---|
| Monomer components (parts by mass) | BA | 42.9 | 42.9 | 42.9 | 42.9 | 42.9 |
|  | MMA | 54.6 | 54.6 | 54.6 | 54.6 | 54.6 |
|  | ST |  |  |  |  |  |
|  | AN |  |  |  |  |  |
|  | AAc | 2.0 | 2.0 | 2.0 | 2.0 | 2.0 |
|  | AM | 0.5 | 0.5 | 0.5 | 0.5 | 0.5 |
|  | Total | 100 | 100 | 100 | 100 | 100 |
| Water dispersion liquid of mechanical defibration type CNF (parts by mass) |  | 133 | 133 | 133 | 133 | 133 |
| Water dispersion liquid of chemical defibration type CNF (standard) (parts by mass) |  |  |  |  |  |  |
| CMC (parts by mass) |  | 1.0 |  |  |  |  |
| Resin/CNF ratio |  | 100/1 | 100/1 | 100/1 | 100/1 | 100/1 |
| Method of making composite |  | Combination 1 (80° C.) | Combination 2 (80° C.) | Combination 3 (80° C.) | Combination 4 (80° C.) | Combination 3 (20° C.) |
| Tg (theoretical value; ° C.) |  | 15 | 15 | 15 | 15 | 15 |
| Non-volatile content (% by mass) |  | 30 | 30 | 30 | 30 | 30 |
| Viscosity (mPa · s) |  | 435 | 385 | 410 | 390 | 5120 |
| Dispersibility of CNF and resin particle |  | A | A | A | A | C |
| Film appearance |  | A | A | A | A | C |
| Tensile strength (MPa) |  | 6.41 | 6.60 | 6.31 | 6.55 | 3.50 |
| Elongation (%) |  | 335 | 340 | 310 | 310 | 115 |
| Gel fraction (% by mass) |  | 50.8 | 52.0 | 50.8 | 51.5 | 42.9 |

TABLE 4

|  |  | Comparative Example 8 | Example 12 | Example 13 | Example 14 | Example 15 | Example 16 |
|---|---|---|---|---|---|---|---|
| Monomer components (parts by mass) | BA | 42.9 | 42.9 | 42.9 | 42.9 | 42.9 | 42.9 |
|  | MMA | 54.6 | 54.6 | 54.6 | 54.6 | 54.6 | 54.6 |
|  | ST |  |  |  |  |  |  |
|  | AN |  |  |  |  |  |  |
|  | AAc | 2.0 | 2.0 | 2.0 | 2.0 | 2.0 | 2.0 |
|  | AM | 0.5 | 0.5 | 0.5 | 0.5 | 0.5 | 0.5 |
|  | Total | 100 | 100 | 100 | 100 | 100 | 100 |
| Water dispersion liquid of mechanical defibration type CNF (parts by mass) | | | 133 | 66.7 | 100 | 400 | 667 |
| Water dispersion liquid of chemical defibration type CNF (standard) (parts by mass) | | | | | | | |
| Water dispersion liquid of chemical defibration type CNF (short) (parts by mass) | | | | | | | |
| Resin/CNF ratio | | 100/0 | 100/1 | 100/0.5 | 100/0.75 | 100/3 | 100/5 |
| Method of making composite | | — | Reaction (80° C.) | Reaction (80° C.) | Reaction (80° C.) | Reaction (80° C.) | Reaction (80° C.) |
| Tg (theoretical value; ° C.) | | 15 | 15 | 15 | 15 | 15 | 15 |
| Non-volatile content (% by mass) | | 35 | 30 | 35 | 35 | 15 | 10 |
| Viscosity (mPa · s) | | 29 | 100 | 50 | 120 | 140 | 220 |
| Dispersibility of CNF and resin particle | | — | A | A | A | B | B |
| Film appearance | | D | A | A | A | A | A |
| Tensile strength (MPa) | | 2.78 | 6.86 | 3.98 | 5.20 | 6.66 | 6.84 |
| Elongation (%) | | 310 | 316 | 388 | 349 | 122 | 68 |
| Gel fraction (% by mass) | | 17.4 | 53.8 | 46.2 | 50.1 | 55.6 | 60.8 |

TABLE 5

|  |  | Example 17 | Example 18 | Comparative Example 9 | Example 19 |
|---|---|---|---|---|---|
| Monomer components (parts by mass) | BA | 42.9 | 42.9 | 42.9 | 42.9 |
|  | MMA | 54.6 | 54.6 | 54.6 | 54.6 |
|  | ST |  |  |  |  |
|  | AN |  |  |  |  |
|  | AAc | 2.0 | 2.0 | 2.0 | 2.0 |
|  | AM | 0.5 | 0.5 | 0.5 | 0.5 |
|  | Total | 100 | 100 | 100 | 100 |
| Water dispersion liquid of mechanical defibration type CNF (parts by mass) | | | | | 133 |
| Water dispersion liquid of chemical defibration type CNF (standard) (parts by mass) | | 133 | | | |
| Water dispersion liquid of chemical defibration type CNF (short) (parts by mass) | | | 133 | | |
| Resin/CNF ratio | | 100/1 | 100/1 | 100/0 | 100/1 |
| Method of making composite | | Reaction (80° C.) | Reaction (80° C.) | — (60° C.) | Reaction (60° C.) |
| Tg (theoretical value; ° C.) | | 15 | 15 | 15 | 15 |
| Non-volatile content (% by mass) | | 25 | 30 | 30 | 30 |
| Viscosity (mPa · s) | | 420 | 10 | 7 | 240 |
| Dispersibility of CNF and resin particle | | A | A | — | A |
| Film appearance | | A | B | D | A |
| Tensile strength (MPa) | | 5.10 | 4.20 | 1.10 | 2.10 |
| Elongation (%) | | 410 | 265 | 491 | 542 |
| Gel fraction (% by mass) | | 28.5 | 15.5 | 49.7 | 66.6 |

TABLE 6

|  |  | Example 20 | Example 21 | Example 22 | Example 23 | Example 24 |
|---|---|---|---|---|---|---|
| Monomer components (parts by mass) | BA | 42.3 | 42.2 | 41.9 | 42.7 | 42.5 |
|  | MMA | 27.6 | 45.5 | 6.8 | 6.8 | 57.5 |
|  | ST | 27.6 |  | 48.8 |  |  |
|  | AN |  | 9.8 |  | 48.0 |  |
|  | AAc | 2.0 | 2.0 | 2.0 | 2.0 | 2.0 |
|  | AM | 0.5 | 0.5 | 0.5 | 0.5 | 0.5 |
|  | Total | 100 | 100 | 100 | 100 | 100 |

TABLE 6-continued

|  | Example 20 | Example 21 | Example 22 | Example 23 | Example 24 |
|---|---|---|---|---|---|
| Water dispersion liquid of mechanical defibration type CNF (parts by mass) | 133 | 133 | 133 | 133 | 133 |
| Water dispersion liquid of chemical defibration type CNF (standard) (parts by mass) |  |  |  |  |  |
| Water dispersion liquid of chemical defibration type CNF (short) (parts by mass) |  |  |  |  |  |
| Resin/CNF ratio | 100/1 | 100/1 | 100/1 | 100/1 | 100/1 |
| Method of making composite | Reaction (80° C.) | Reaction (80° C.) | Reaction (80° C.) | Reaction (80° C.) | Reaction (80° C.) |
| Tg (theoretical value; ° C.) | 15 | 15 | 15 | 15 | 15 |
| Non-volatile content (% by mass) | 30 | 30 | 30 | 30 | 30 |
| Viscosity (mPa · s) | 250 | 180 | 110 | 120 | 50 |
| Dispersibility of CNF and resin particle | A | A | A | A | A |
| Film appearance | A | A | A | A | A |
| Tensile strength (MPa) | 5.81 | 6.12 | 6.50 | 6.90 | 6.20 |
| Elongation (%) | 337 | 389 | 315 | 400 | 320 |
| Gel fraction (% by mass) | 45.3 | 50.7 | 50.1 | 58.3 | 52.0 |

As shown in Tables 1 to 6, the evaluation result of the dispersibility of CNF and the resin particle was A or B for each of the composite resin compositions produced in Examples 1 to 24. That is, with respect to each of the composite resin compositions produced in Examples 1 to 24, when the sample prepared from the composite resin composition was observed with AFM, a structure such that CNF is dispersed, and when the CNF is assumed to be an axis, the resin particles gather at the periphery along the axis in the form of a bunch of grapes and cling to the axis was ascertained (see, for example, Examples 1 and 5 in FIG. 1). As a result, it was ascertained that each of the composite resin compositions produced in Examples 1 to 24 is capable of forming a film in which CNF is dispersed in the resin in a sufficiently uniform manner (see, for example, Examples 1 to 3 in FIG. 2).

On the other hand, as shown in Tables 1 to 6, the evaluation result of the dispersibility of CNF and the resin particle was C for each of the composite resin compositions produced in Comparative Examples 2 to 7. That is, with respect to each of the composite resin compositions produced in Comparative Examples 2 to 7, when the sample prepared from the composite resin composition was observed with AFM, the aggregate containing CNF was observed, and a structure such that the resin particles also aggregate accompanying the generation of the aggregate was observed (see, for example, Comparative Example 4 in FIG. 1). As a result, from each of the composite resin compositions produced in Comparative Examples 2 to 7, a film in which the aggregate containing CNF exists was formed (see, for example, Comparative Examples 3 and 4 in FIG. 2).

Comparative Example 12

A test corresponding to Example 1 described in Patent Literature 4 mentioned previously was conducted. Specifically, the test is as follows. In a 500-mL reaction container to which a stirrer, a thermometer, a cooling pipe, and a nitrogen introduction pipe were attached, 667 parts by mass of a water dispersion liquid (having a solid content of 1.5% by mass) of a TEMPO-oxidized cellulose nanofiber (trade name "cellenpia TC-01A", manufactured by Nippon Paper Industries Co., Ltd.), 100 parts by mass of ethyl acrylate, and 5 parts by mass of sodium dodecylbenzene sulfonate as an anionic emulsifier were charged, and a nitrogen purge was performed for 5 minutes while a resultant mixture was being stirred slowly at normal temperature (25° C.). Next, after the temperature was raised with a water bath until the liquid temperature in the reaction container became 70° C., 1 part by mass of ammonium persulfate dissolved in a small amount of water was put therein as an initiator, and reaction was performed for 120 minutes to obtain an emulsified product (having a non-volatile content of 15% by mass) with a polymerization ratio of 90% or more.

Comparative Example 13

A test corresponding to Example 2 described in Patent Literature 5 mentioned previously was conducted. Specifically, the test is as follows. In a 500-mL reaction container to which a stirrer, a thermometer, a cooling pipe, and a nitrogen introduction pipe were attached, 667 parts by mass of the water dispersion liquid (having a solid content of 1.5% by mass) of "cellenpia TC-01A" and 5 parts by mass of a caustic soda aqueous solution (having a concentration of 1 part by mass) were charged, and after the temperature was raised until the liquid temperature became 80° C. while a resultant mixture was being stirred, 30 parts by mass of glycidyl methacrylate (the active ingredient of which was 100%) was put therein to perform reaction for 60 minutes. After part of this reaction liquid was fractionated, unreacted glycidyl methacrylate (GMA) was washed away sufficiently with acetone, the fractionated reaction liquid was then analyzed with a Fourier transform infrared spectrophotometer (FT-IR) to ascertain an absorption peak derived from GMA at around 1730 to 1740 cm$^{-1}$, and thus a GMA-modified cellulose nanofiber was obtained. In the reaction container where the water dispersion liquid of the GMA-modified cellulose nanofiber was left, 70 parts by mass of ethyl acrylate, and 5 parts by mass of sodium dodecylbenzene sulfonate as an anionic emulsifier were charged, and a nitrogen purge was performed for 5 minutes while a resultant mixture was being stirred slowly at normal temperature (25° C.). Next, after the temperature of the liquid in the reaction container was adjusted to 70° C., 1 part by mass of ammonium persulfate dissolved in a small amount of water was put therein as an initiator, and reaction was performed for 120 minutes to obtain an emulsified product (having a non-volatile content of 15% by mass) with a polymerization ratio of 90% or more.

(Check on Dispersibility of CNF and Resin Particle for Emulsified Products of Comparative Examples 12 and 13)

A sample was prepared for each of the emulsified products obtained in Comparative Examples 12 and 13 in the same manner as in the method mentioned in "(Dispersibility of CNF and Resin Particle)" described above and was observed using the atomic force microscope (AFM). FIG. 3 shows obtained respective observation images (observation images of a 50 μm square region and observation images of a 3 μm square region). As shown in FIG. 3, when each sample for each of the emulsified products obtained in Comparative Example 12 and Comparative Example 13 was observed with AFM, a structure such that the resin particles cling to the cellulose nanofiber (CNF) in the form of particles was not observed, and it was observed that the resin particles aggregate on their own to be made into a state like a continuous phase of the resin (see relatively bright region parts in FIG. 3), and CNF exists in groups of CNFs (see relatively dark region parts in FIG. 3). From these results, it was considered that according to the methods described in respective Examples of Patent Literatures 4 and 5, there is a possibility that CNF is dispersed, but the resin particle is unlikely to be dispersed uniformly at a high level.

(Check on Film Appearance for Emulsified Products of Comparative Examples 12 and 13)

A film was prepared for each of the emulsified products obtained in Comparative Examples 12 and 13 in the same manner as in the method mentioned in "(Film Appearance)" described above, and the prepared film was observed visually to check the film appearance. FIG. 4 shows photographs of these films. As shown in FIG. 4, a crack was hardly ascertained in each film obtained using each of the emulsified products obtained in Comparative Example 12 and Comparative Example 13, but the aggregate was ascertained, and a uniform film was not obtained (evaluation "C" in the film appearance).

As mentioned above, when the previously mentioned observation with the atomic force microscope was performed in Comparative Examples 12 and 13, a structure such that the resin particles cling in the form of particles to a dispersed cellulose nanofiber was not observed. It is considered that this is because the method in which the cellulose nanofiber dispersion liquid, the polymerizable monomers, and the anionic emulsifier were mixed together in the reaction container, then the liquid temperature was raised to 70° C., and subsequently the initiator was put therein to perform reaction was adopted in Comparative Examples 12 and 13.

The invention claimed is:

1. A composite resin composition comprising:
an aqueous dispersion medium;
a resin particle emulsified in the aqueous dispersion medium; and
a cellulose nanofiber dispersed in the aqueous dispersion medium,
wherein the resin particle comprises at least one material selected from the group consisting of a (meth)acrylic resin particle and a (meth)acrylonitrile-based resin particle,
a content of the cellulose nanofiber in the composite resin composition is in a range from 0.1 to 10 parts by mass per 100 parts by mass of the resin particle in the composite resin composition,
the composite resin composition is produced by a process comprising: bringing a resin emulsion in which the resin particle is emulsified in the aqueous dispersion medium, and the cellulose nanofiber into contact with each other at a temperature in a range from 50 to 80° C., thereby mixing the resin emulsion and the cellulose nanofiber, and
the resin particle and the cellulose nanofiber are present in the composite resin composition in a structure in which a plurality of the resin particles cling to the cellulose nanofiber dispersed in the aqueous dispersion medium,
wherein the structure is observable with an atomic force microscope by diluting the composite resin composition with water so that a non-volatile content of the composite resin composition becomes in a range from 0.01 to 0.1% by mass, dropping the diluted composition onto a base material for measurement, and drying the dropped diluted composition.

2. The composite resin composition according to claim 1, wherein in the structure, the plurality of the resin particles botryoidally gather along and around the cellulose nanofiber as a stem.

3. The composite resin composition according to claim 1, wherein the resin particle further comprises a structural unit derived from at least one polymerizable monomer selected from the group consisting of an unsaturated carboxylic acid-based monomer and a (meth)acrylamide-based monomer.

4. The composite resin composition according to claim 1, wherein the resin particle comprises the (meth)acrylic resin particle.

* * * * *